US009154050B2

(12) United States Patent
Ushiki et al.

(10) Patent No.: US 9,154,050 B2
(45) Date of Patent: Oct. 6, 2015

(54) STATIC SYNCHRONOUS COMPENSATOR AND VOLTAGE CONTROL METHOD

(71) Applicant: Origin Electric Company, Limited, Tokyo (JP)

(72) Inventors: Shuichi Ushiki, Tokyo (JP); Masaaki Ohshima, Tokyo (JP)

(73) Assignee: ORIGIN ELECTRIC COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/402,914

(22) PCT Filed: Aug. 13, 2013

(86) PCT No.: PCT/JP2013/071846
§ 371 (c)(1),
(2) Date: Nov. 21, 2014

(87) PCT Pub. No.: WO2014/034427
PCT Pub. Date: Mar. 6, 2014

(65) Prior Publication Data
US 2015/0162847 A1    Jun. 11, 2015

(30) Foreign Application Priority Data

Aug. 30, 2012  (JP) ................................. 2012-190093

(51) Int. Cl.
*H02M 7/217*    (2006.01)
*H02M 7/46*    (2006.01)
(Continued)

(52) U.S. Cl.
CPC .. *H02M 7/46* (2013.01); *H02J 3/16* (2013.01); *H02J 3/1842* (2013.01); *Y02E 40/22* (2013.01); *Y02E 40/34* (2013.01)

(58) Field of Classification Search
CPC ........... H02M 7/02; H02M 7/04; H02M 7/12; H02M 7/21; H02M 7/217; Y02B 70/1441; Y02E 40/30; Y02E 40/32
USPC .................. 363/76, 81, 84, 88, 89, 125, 127; 323/205, 207, 212, 217, 237
See application file for complete search history.

(56) References Cited

U.S. PATENT DOCUMENTS 5,801,517 A  *  9/1998  Borle .............................. 323/207
7,944,184 B2 *  5/2011  Choy et al. ....................... 322/37
(Continued)

FOREIGN PATENT DOCUMENTS

| JP | 2008149694 | 6/1996 |
| JP | 2002-374623 | 12/2002 |
| JP | 2012123450 | 6/2012 |

OTHER PUBLICATIONS

Kuzumaki, et al.; "Static Synchronous Compensator for Effective Use of Renewable Energies in Smart Grids" vol. 66 No. 12; (2011); 3 pages.

(Continued)

*Primary Examiner* — Gary L Laxton
(74) *Attorney, Agent, or Firm* — Ohlandt Greeley Ruggiero & Perle L.L.P.

(57) ABSTRACT

A static synchronous compensator that generates a second axis voltage command from the difference between the DC voltage converted by a single-phase voltage AC-DC conversion circuit and a set DC voltage command. When the voltage (the voltage of an AC terminal) of the single-phase AC power system increases, since the difference between the voltage of the AC terminal and an internal electromotive force increases, the static synchronous compensator carries out a PWM control to decreases the voltage of the AC terminal side of the single-phase voltage AC-DC conversion circuit. Since the voltage of the single-phase voltage AC-DC conversion circuit becomes lower than the voltage of the single-phase AC power system, an ineffective current flows from single-phase AC power system in the static synchronous compensator so that the voltage of the single-phase AC power system can be decreased.

9 Claims, 16 Drawing Sheets

(51) Int. Cl.
  *H02J 3/16* (2006.01)
  *H02J 3/18* (2006.01)
  *H02M 7/219* (2006.01)

(56) References Cited

U.S. PATENT DOCUMENTS 8,279,647 B2* 10/2012 Jin et al. .................. 363/89
8,542,511 B2* 9/2013 Ohshima et al. ............. 363/84
2008/0232143 A1* 9/2008 Chu et al. .................. 363/37
2012/0139506 A1 6/2012 Matsuda

OTHER PUBLICATIONS

International Search Report dated Oct. 8, 2013 corresponding to International PCT Application No. PCT/JP2013/071846; 3 pages.
International Preliminary Report on Patentability dated Mar. 12, 2015 corresponding to International Patent Application No. PCT/JP2013/071846; 5 pages.

* cited by examiner

STATIC SYNCHRONOUS COMPENSATOR AND VOLTAGE CONTROL METHOD

BACKGROUND

1. Field of the Disclosure

The disclosure relates to a static synchronous compensator and a voltage control method for adjusting the voltage of a power system by controlling an ineffective power of a single-phase AC power system.

2. Discussion of the Background Art

Ordinarily, in a power system, the voltage of a system terminal, which apart from a power supply side decreases. However, when a dispersed power source, which uses renewable energy such as solar photovoltaics (PV) and wind power generation, is connected to the power system, a fear arises in that the voltage of the system terminal increases. When a power is supplied from a transformer station as in the past, there is conceived the case that a low voltage distributed in the power system becomes out of a proper voltage range. To cope with the problem, it has been known to connect a static synchronous compensator to the power system to set the low voltage distributed in the power system within a proper voltage range (refer to, for example, Non Patent Literature 1). The static synchronous compensator is also called "STATCOM (Static Synchronous Compensator)" or "a self-exciting SVC (Static Var Compensator)".

CITATION LIST

Non Patent Literature

Non Patent Literature 1: "Static Synchronous Compensator for Effective Use of Renewable Energies in Smart Grids" Toshiba Review Vol. 66, No. 12 (2011) P 36-39

DISCLOSURE

In future, as a smart grid is increasingly used, it is predicted that PV is become wide spread to ordinary homes to which a single-phase AC power is supplied. This requires adjustment of the voltage in a single-phase AC power system. However, there is a problem in that a conventional static synchronous compensator is to adjust the voltage of a three-phase AC current as in STATCOM of Non-Patent Literature 1 and cannot adjust the voltage in the single-phase AC power system.

An object of the disclosure is to provide a static synchronous compensator and a voltage control method capable of adjusting the voltage in the single-phase AC power system.

SUMMARY

To achieve the object, a static synchronous compensator according to the disclosure generates a second axis voltage command from the difference between the DC voltage detected on the DC terminal side of the static synchronous compensator and a set DC voltage command.

Specifically, a static synchronous compensator according to the present disclosure includes:

a single-phase voltage AC-DC conversion circuit having an internal electromotive force and an internal equivalent impedance when viewed from an AC terminal and converting between a single-phase AC power from a single-phase AC power system connected to the AC terminal and a DC power according to the pulse width of a gate signal generated based on a PWM command;

a voltage command circuit outputting a first axis voltage command acting as an amplitude target value of a single-phase AC voltage of the AC terminal, set with a DC voltage command value higher than the peak value of the single-phase AC voltage, detecting the DC voltage converted by the single-phase voltage AC-DC conversion circuit, and outputting the second axis voltage command by calculating the difference between the DC voltage command value and the DC voltage detection value;

a phase difference generation circuit having a phase-delayed single-phase AC current generator for delaying the phase of a single-phase AC voltage of the AC terminal and generating a delayed single-phase AC current and generating a voltage corresponding to the phase difference between the single-phase AC voltage of the AC terminal and the internal electromotive force of the single-phase voltage AC-DC conversion circuit based on the delayed single-phase AC current;

a upper voltage control circuit outputting a voltage command signal generated so that the amplitude of the single-phase AC voltage of the AC terminal approaches the first axis voltage command and a frequency command signal generated so that a voltage corresponding to the phase difference from the phase difference generation circuit approaches the second axis voltage command based on the first axis voltage command and the second axis voltage command from the voltage command circuit, the voltage corresponding to the phase difference from the phase difference generation circuit, and the single-phase AC voltage of the AC terminal;

a frequency control circuit set with a reference frequency acting as a reference of the frequency of the single-phase AC current in the AC terminal, determining the electric angle of the internal electromotive force of the single-phase voltage AC-DC conversion circuit based on the reference frequency, the frequency command signal from the upper voltage control circuit, and the voltage corresponding to the phase difference generated by the phase difference generation circuit, and generating a generated electric angle; and a lower voltage control circuit set with a reference voltage acting as a reference of the voltage amplitude of the single-phase AC current in the AC terminal, using the value obtained by adding the voltage command signal from the upper voltage control circuit to the value, which is obtained by multiplying the signal based on the electric angle from the frequency control circuit and the reference voltage, as an internal electromotive force and outputting the difference between the internal electromotive force and the single-phase AC voltage as the PWM command.

According to the present disclosure, a voltage control method for converging the voltage of a single-phase AC power system in a proper voltage range using a single-phase voltage AC-DC conversion circuit having an internal electromotive force and an internal equivalent impedance when viewed from an AC terminal and converting between a single-phase AC power from the single-phase AC power system connected to the AC terminal and a DC power according to the pulse width of a gate signal generated based on a PWM command, includes:

a voltage command process outputting a first axis voltage command acting as an amplitude target value of a single-phase AC voltage of the AC terminal, set with a DC voltage command value higher than the peak value of the single-phase AC voltage, detecting the DC voltage converted by the single-phase voltage AC-DC conversion circuit, and outputting the second axis voltage command by calculating the difference between the DC voltage command value and the DC voltage detection value;

a phase difference generation process generating a delayed single-phase AC current in which the phase of a single-phase AC voltage of the AC terminal is delayed by a phase-delayed single-phase AC current generator and generating a voltage corresponding to the phase difference between the single-phase AC voltage of the AC terminal and the internal electromotive force of the single-phase voltage AC-DC conversion circuit based on the delayed single-phase AC current;

a upper voltage control process for outputting a voltage command signal generated so that the amplitude of the single-phase AC voltage of the AC terminal approaches the first axis voltage command and a frequency command signal generated so that a voltage corresponding to the phase difference generated by the phase difference generation process approaches the second axis voltage command based on the first axis voltage command and the second axis voltage command output at the voltage command process, the voltage corresponding to the phase difference generated at the phase difference generation process, and the single-phase AC voltage of the AC terminal;

a frequency control process determining the electric angle of the internal electromotive force of the single-phase voltage AC-DC conversion circuit based on a reference frequency acting as a reference of the frequency of the single-phase AC current in the AC terminal and on a voltage corresponding to the frequency command signal output at the upper voltage control process and the phase difference generated at the phase difference generation process and generating a generated electric angle; and a lower voltage control process using the value obtained by adding the voltage command signal output at the upper voltage control process to the value, which is obtained by multiplying a reference voltage acting as a reference of the voltage amplitude of the single-phase AC current in the AC terminal and the signal based on the electric angle from the frequency control circuit, as the internal electromotive force and outputting the difference between the internal electromotive force and the single-phase AC voltage as the PWM command.

The static synchronous compensator and the voltage control method using the device according to the disclosure generates the second axis voltage command from the difference between the detected DC voltage value and the DC voltage command value. The device and the method generate an internal electromotive force based on the second axis voltage command and the first axis voltage command acting as a voltage target value of the AC terminal, generate the PWM command based on the difference between the internal electromotive force and the voltage of the AC terminal, and control the voltage of the AC terminal side of an inverter (a single-phase AC-DC conversion circuit). When, for example, the voltage (the AC terminal voltage) of the single-phase AC power system increases, since the difference between the AC terminal voltage and the internal electromotive force increases, the static synchronous compensator carries out a PWM control to decreases the voltage of the AC terminal side of the single-phase voltage AC-DC conversion circuit. Since the voltage of the single-phase voltage AC-DC conversion circuit becomes lower than the voltage of the single-phase AC power system, an ineffective current flows from the single-phase AC power system in the static synchronous compensator so that the voltage of the single-phase AC power system can be decreased.

Thus, the disclosure can provide the static synchronous compensator and the voltage control method capable of adjusting the voltage in the single-phase AC power system.

The first axis voltage command output by the voltage command circuit of the static synchronous compensator according to the disclosure may be a fixed value having been preset. This allows for calculating and monitoring the ineffective power.

The static synchronous compensator according to the disclosure further includes an AC current detecting circuit for detecting the AC current in the AC terminal and an AC power measuring circuit for measuring the ineffective power in the AC terminal.

The voltage command circuit may calculate the difference between the ineffective power measured by the AC power measuring circuit and a preset ineffective power command value and use the difference as the first axis voltage command.

The voltage control method of the single-phase AC power system according to the disclosure connects the AC terminal of at least one set of the static synchronous compensator according to any of claims 1 to 3 to the single-phase AC power system and converges the voltage of the single-phase AC power system to a proper voltage range. Connecting plural static synchronous compensators according to the disclosure to the single-phase AC power system can more effectively set the low voltage distributed in the power system in the proper voltage range.

Effects of the Disclosure

The disclosure can provide the static synchronous compensator and the voltage adjusting method capable of adjusting the voltage in the single-phase AC power system.

DETAILED DESCRIPTION OF THE PREFERRED EMBODIMENT

Figure 1:
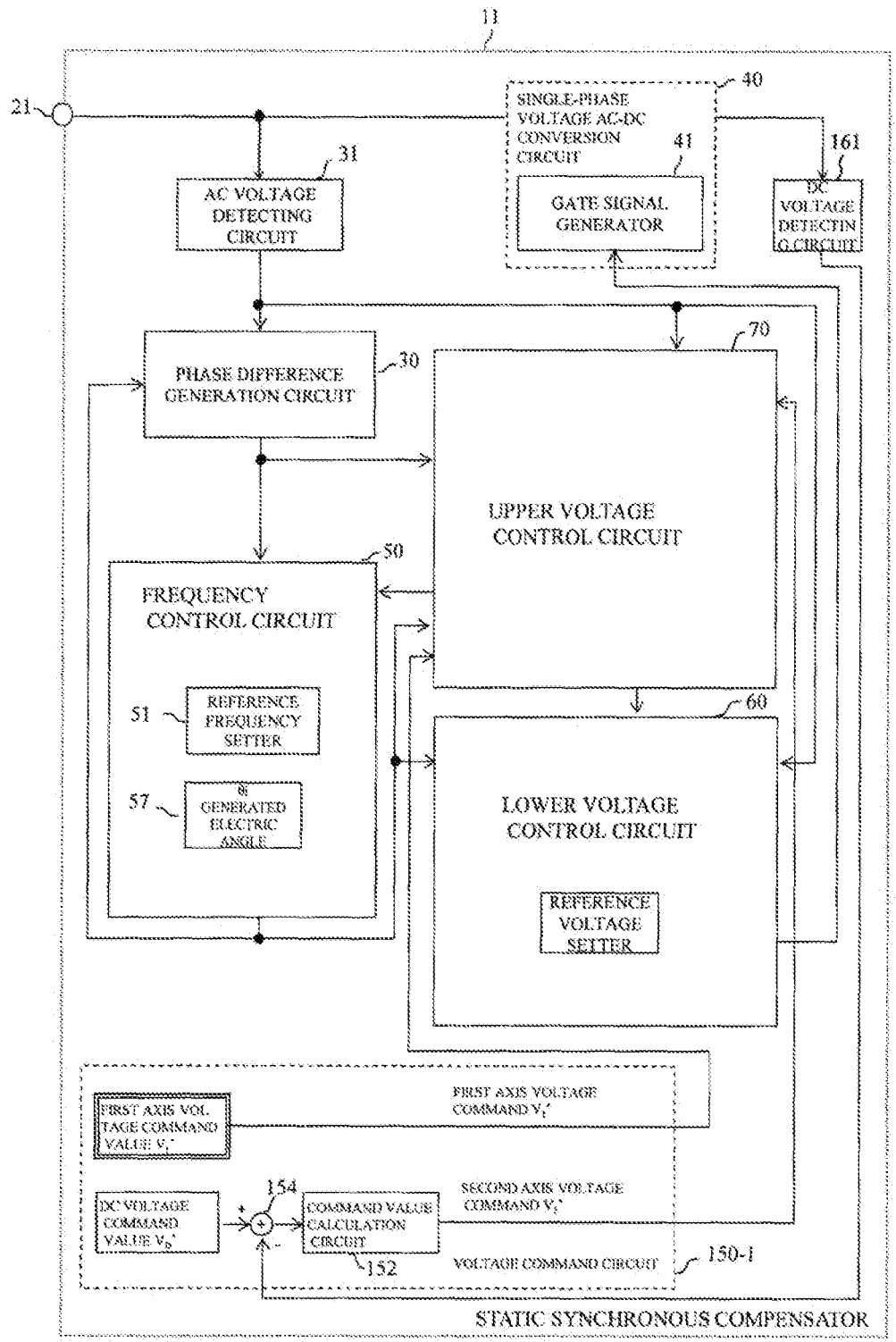
FIG. 1 is a schematic configuration view of a static synchronous compensator according to the disclosure.

An embodiment of the disclosure will be explained referring to the accompanying drawings. The embodiment explained below is examples embodied by the disclosure and the disclosure is not restricted by the following embodiment. The examples of the embodiment are only exemplifications of the embodiment, and the disclosure can be embodied in the modes variously changed and improved based on the knowledge of a person skilled in the art. In the specification and the drawings, it is assumed that the components denoted by the same reference numerals show the same components.

Static Synchronous Compensator

Figure 2:
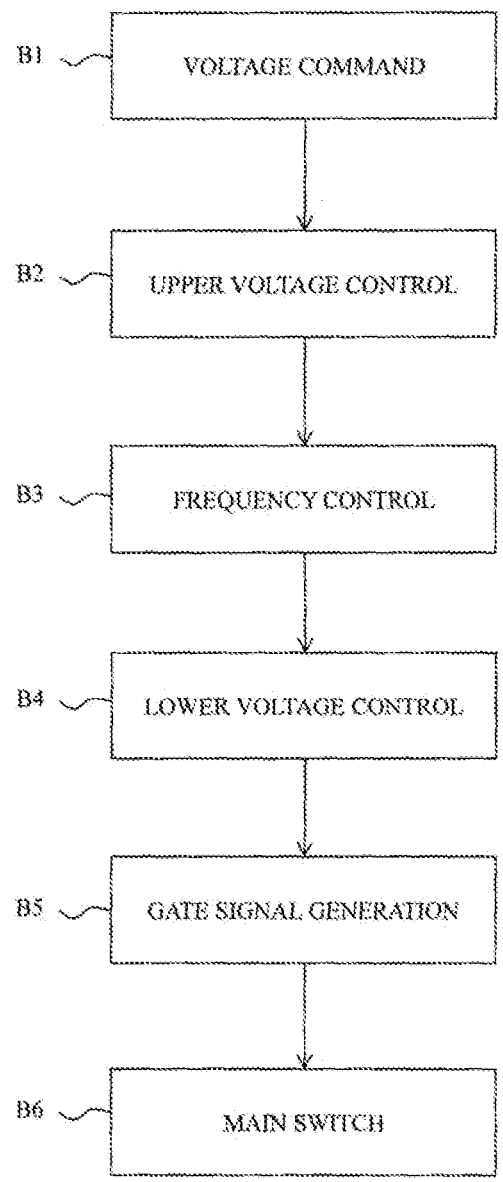
FIG. 2 is a view showing a control flow in the static synchronous compensator according to the disclosure.

FIG. 1 shows a schematic configuration view of a static synchronous compensator according to the embodiment, and FIG. 2 is a view exemplifying a control flow in the static synchronous compensator. As shown in FIG. 2, in the static synchronous compensator according to the embodiment, a first axis voltage command and a second axis voltage command are generated by a voltage command circuit (B1), a voltage command signal and a frequency command signal are generated by a upper voltage control circuit so that the amplitude and the frequency of a single-phase AC voltage approach the first axis voltage command and the second voltage command (B2), the electric angle of the internal electromotive force of a single-phase voltage AC-DC conversion circuit is determined by a frequency control circuit (B3), a current command for making the AC voltage of the single-phase voltage AC-DC conversion circuit constant is generated by a lower voltage control circuit (B4), a gate signal is generated by a gate signal generator (B5), and a main switch is operated (B6). The single-phase voltage AC-DC converter included in the single-phase voltage AC-DC conversion circuit 40 of FIG. 1 corresponds to the main switch B6 of FIG. 2.

The control flow shown in FIG. 2 will be explained below in more detail.

The static synchronous compensator 11 shown in FIG. 1 includes a single-phase voltage AC-DC conversion circuit 40 that has the internal electromotive force and an internal equivalent impedance when viewed from an AC terminal 21 and converts between the single-phase AC power and the single-phase DC power from the single-phase AC power system connected to the AC terminal 21 according to the pulse width of a gate signal generated based on the PWM command, a voltage command circuit 150-1 that outputs the first axis voltage command acting as an amplitude target value of the single-phase AC voltage of the AC terminal 21, is set with a DC voltage command value higher than the peak value of the single-phase AC voltage, detects the DC voltage converted by the single-phase voltage AC-DC conversion circuit 40, calculates the difference between the DC voltage command value and the DC voltage detection value, and outputs the second axis voltage command, a phase difference generation circuit 30 that has a phase-delayed single-phase AC current generator for delaying the phase of the single-phase AC voltage of the AC terminal 21 and generating a delayed single-phase AC current and generates a voltage corresponding to the phase difference between the single-phase AC voltage of the AC terminal 21 and the internal electromotive force of the single-phase voltage AC-DC conversion circuit 40 based on the delayed single-phase AC current, a upper voltage control circuit 70 that outputs the voltage command signal generated so that the amplitude of the single-phase AC voltage of the AC terminal 21 approaches the first axis voltage command and outputs the frequency command signal generated so that the voltage corresponding to the phase difference from the phase difference generation circuit approaches the second axis voltage command based on the first axis voltage command and the second axis voltage command from the voltage command circuit 150-1, the voltage corresponding to the phase difference from the phase difference generation circuit 30, and the single-phase AC voltage of the AC terminal, a frequency control circuit 50 to which a reference frequency acting as a reference of the frequency of the single-phase AC current in the AC terminal 21 is set and that determines the electric angle of the internal electromotive force of the single-phase voltage AC-DC conversion circuit 40 based on the reference frequency, the frequency command signal from the upper voltage control circuit 70, and the voltage corresponding to the phase difference generated by the phase difference generation circuit 30, and generates a generated electric angle, and a lower voltage control circuit 60 to which a reference voltage acting as a reference of the voltage amplitude of the single-phase AC current in the AC terminal 21 is set and that sets the internal electromotive force to the value obtained by adding the voltage command signal from the upper voltage control circuit 70 and the value obtained by multiplying the signal based on the electric angle from the frequency control circuit 50 and the reference voltage and outputs the difference between the internal electromotive force and the single-phase AC voltage as the PWM command.

Figure 3:
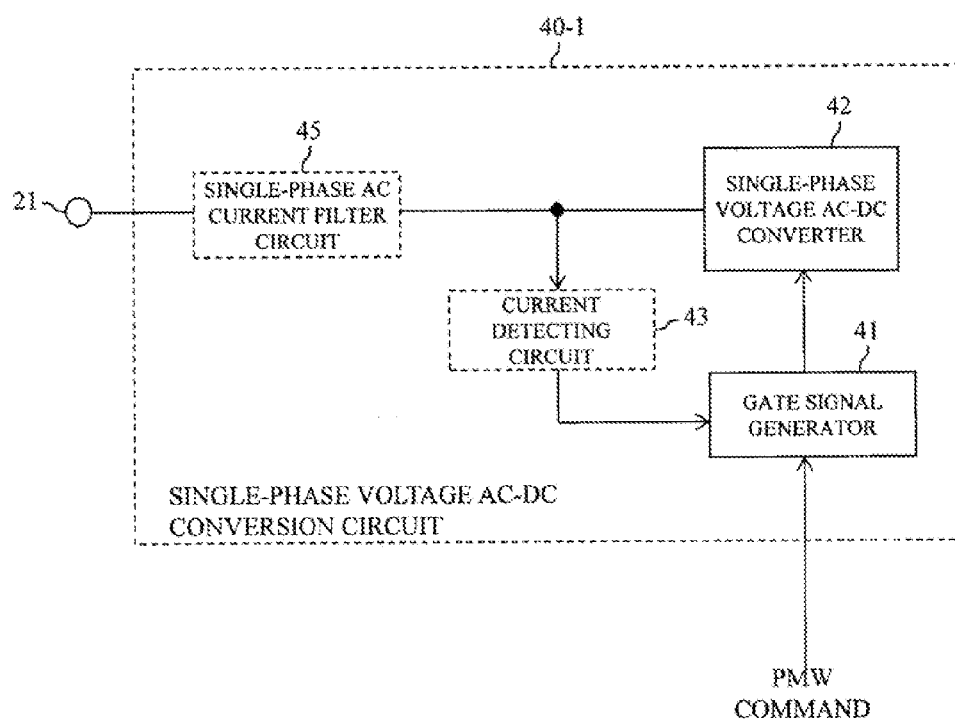
FIG. 3 is a schematic configuration view of the single-phase voltage AC-DC conversion circuit provided by the static synchronous compensator according to the disclosure.
Figure 4:
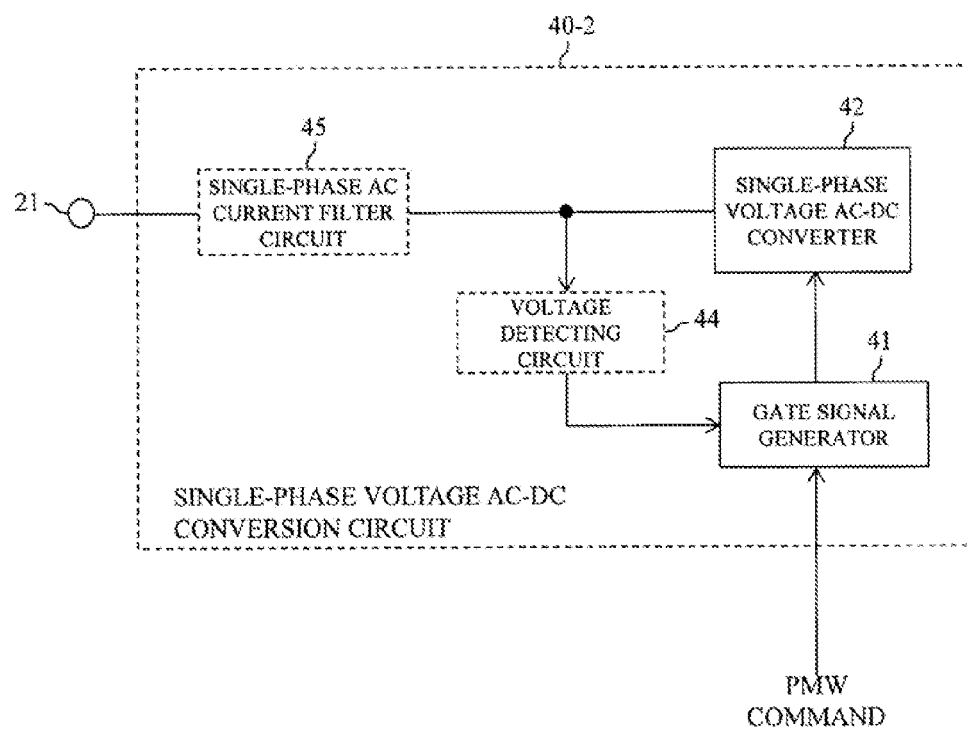
FIG. 4 is a schematic configuration view of a single-phase voltage AC-DC conversion circuit provided with the static synchronous compensator according to the disclosure.

FIG. 3 and FIG. 4 show schematic configuration views of the single-phase voltage AC-DC conversion circuits 40.

A single-phase voltage AC-DC conversion circuit 40-1 shown in FIG. 3 has an internal equivalent impedance when viewed from the AC terminal 21 and includes a single-phase voltage AC-DC converter 42 that converts between the single-phase AC power and a DC power of the AC terminal 21 according to the pulse width of a gate signal, a current detecting circuit 43 that detects the current between the single-phase voltage AC-DC converter 42 and a single-phase AC current filter circuit 45 and outputs a signal generated according to the amplitude of the single-phase AC current, a gate signal generator 41 that generates the gate signal so that the difference between the PWM command and the output from the current detecting circuit 43 approaches zero and outputs the gate signal, and the single-phase AC current filter circuit 45 that removes a high frequency component caused by the gate signal in the single-phase voltage AC-DC converter 42 from the single-phase AC voltage of the single-phase voltage AC-DC converter 42 and interconnects the single-phase AC voltage to the system.

Further, a single-phase voltage AC-DC conversion circuit 40-2 shown in FIG. 4 includes a voltage detecting circuit 44 that detects the single-phase AC voltage of the single-phase voltage AC-DC converter 42 and outputs a signal generated according to the amplitude of the single-phase AC voltage in place of the current detecting circuit 43 of FIG. 3. In the case, the gate signal generator 41 generates the gate signal so that the difference between the PWM command and the output from the voltage detecting circuit 44 approaches zero and outputs the gate signal.

Figure 5:
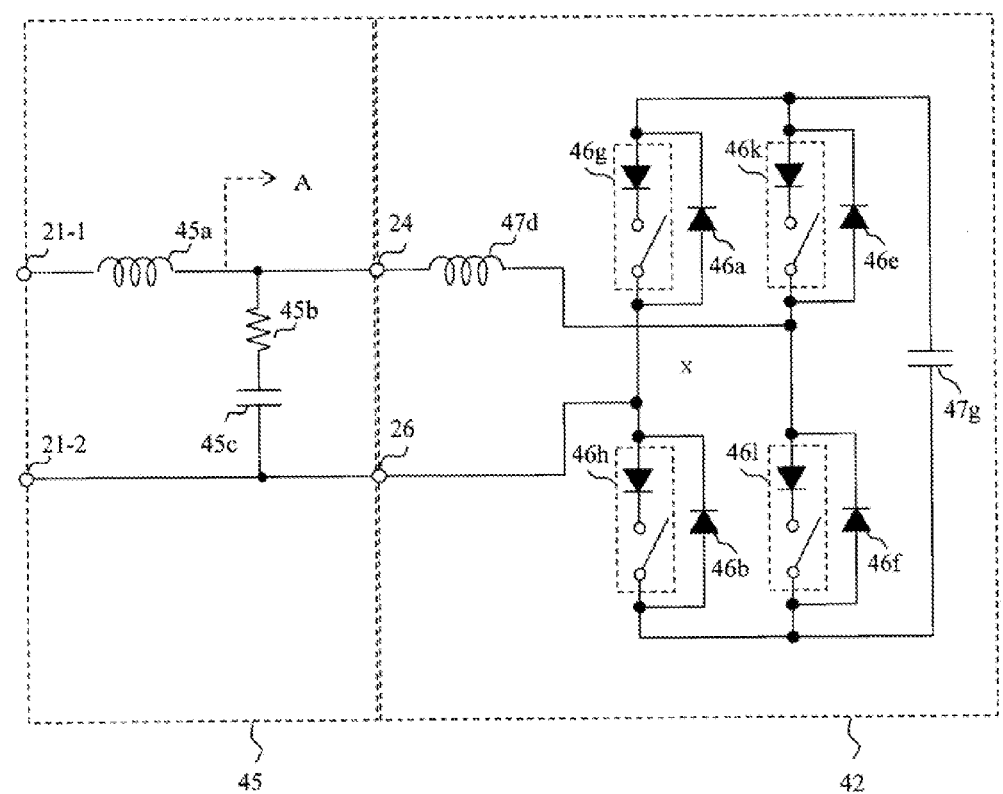
FIG. 5 is a schematic configuration view of a single-phase AC current filter circuit and a single-phase voltage AC-DC converter in the single-phase voltage AC-DC conversion circuit provided by the static synchronous compensator according to the disclosure.

FIG. 5 shows a schematic configuration view of the single-phase voltage AC-DC converter 42 and the single-phase AC current filter circuit 45 in FIG. 3 and FIG. 4.

The single-phase voltage AC-DC converter 42 shown in FIG. 5 includes four self-arc-extinguishing switches 46g, 46h, 46k, and 46l and four diodes 46a, 46b, 46e, and 46f. The self-arc-extinguishing switches 46g, 46h, 46k, and 46l are elements for switching on and off the switches according to on/off of an input signal and can be exemplified by a MOSFET (field-effect transistor) and an IGBT (insulation gate bipolar transistor). The single-phase voltage AC-DC converter 42 is input with the gate signal from the gate signal generator 41 shown in FIG. 1 as an input signal. The single-phase voltage AC-DC converter 42 can convert an alternating current and a direct current by switching on and off each of the four self-arc-extinguishing switches 46g, 46h, 46k, and 46l in response to a pulse signal according to the gate signal. In FIG. 5, AC terminals 21-1 and 21-2 correspond to the AC terminal 21 of FIG. 1. Further, a serial capacitor 47g is connected in parallel with the four switch groups. A battery or a capacitor such as an electric double layer capacitor may be connected in place of the serial capacitor 47g.

The single-phase AC current filter circuit 45 shown in FIG. 5 is composed of an inductance 45a, a resistor 45b, and a capacitor 45c and can be interconnected to the system by removing the high frequency component caused by the gate signal in the single-phase voltage AC-DC converter 42 from the single-phase AC voltage of the single-phase voltage AC-DC converter 42. The resistor 45b may not be connected depending on an operating condition.

Figure 6:
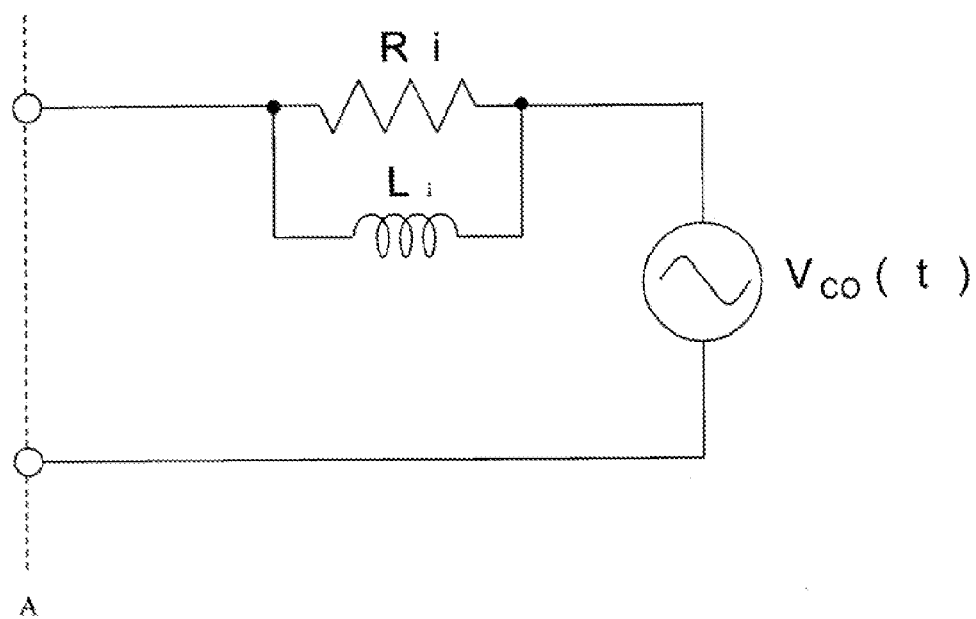
FIG. 6 is an equivalent circuit when viewed from the AC terminal of the static synchronous compensator according to the disclosure.

FIG. 6 is an equivalent circuit of the static synchronous compensator shown in FIG. 3 and FIG. 4 when viewed from the AC terminal, and more specifically is an equivalent circuit when the DC current side is viewed from an arrow A point except the inductance 45a of the single-phase AC current filter circuit 45 in the circuit diagram shown in FIG. 5. In FIG. 6, Vco(t) is the internal electromotive force, and the internal equivalent impedance is a parallel circuit of a resistance component Ri and an inductance component Li.

The internal equivalent impedance provided with the single-phase voltage AC-DC converter 42 shown in FIG. 3 and FIG. 4 can be provided by a control variable in the static synchronous compensator 11 of FIG. 1 or can be provided by connecting a resistor, a reactor, or a single-phase transformer or a combination of them to the output of the single-phase voltage AC-DC conversion circuit 40-1, 40-2 of FIG. 3 and of FIG. 4. For example, the resistor or the reactor may be connected in series to the single-phase output of the single-phase voltage AC-DC conversion circuits 40-1, 40-2, and further when the resistor is connected, the reactor may be connected in series behind the resistor. Further, a single-phase transformer may be connected to the single-phase output of the single-phase voltage AC-DC conversion circuits 40-1, 40-2. When the reactor is connected to the single-phase output of the single-phase voltage AC-DC conversion circuits 40-1, 40-2, the single-phase transformer may be connected behind the reactor. Further, when the resistor is connected to the single-phase output of the single-phase voltage AC-DC conversion circuits 40-1, 40-2 and the reactor is connected in series behind the resistor, the single-phase transformer may be connected behind the reactor. As described above, the provision of the internal equivalent impedance with the single-phase voltage AC-DC conversion circuit 40 connects the static synchronous compensator 11 of FIG. 1 to the power system as a load capable of changing an ineffective power so that the AC voltage of the power system can be adjusted.

Further, a current error can be controlled to fall within an allowable range or an output voltage can be caused to follow the PWM command by detecting the current or the voltage between the single-phase AC current filter circuit 45 and the single-phase voltage AC-DC converter 42 by the current detecting circuit 43 or the voltage detecting circuit 44 and generating the gate signal by the gate signal generator 41 so that the difference between the PWM command and the output from the current detecting circuit 43 or the voltage detecting circuit 44 approaches zero.

Voltage Command

The voltage command circuit 150-1 of FIG. 1 is preset with or input from outside with the voltage (the appropriate voltage) of the AC terminal 21 as a first axis voltage command value $V_1^*$ and outputs the value as a first axis voltage command $V_1^*$. Further, the voltage command circuit 150-1 is input with the DC voltage detection value obtained by detecting the DC voltage, which is converted by the single-phase voltage AC-DC conversion circuit 40, by a DC voltage detecting circuit 161, an adding circuit 154 calculates the difference between the DC voltage detection value and a DC voltage command value $V_D^*$, and a command value calculation circuit 152, which will be described later, generates and outputs a second axis voltage command $V_2^*$.

Figure 7:
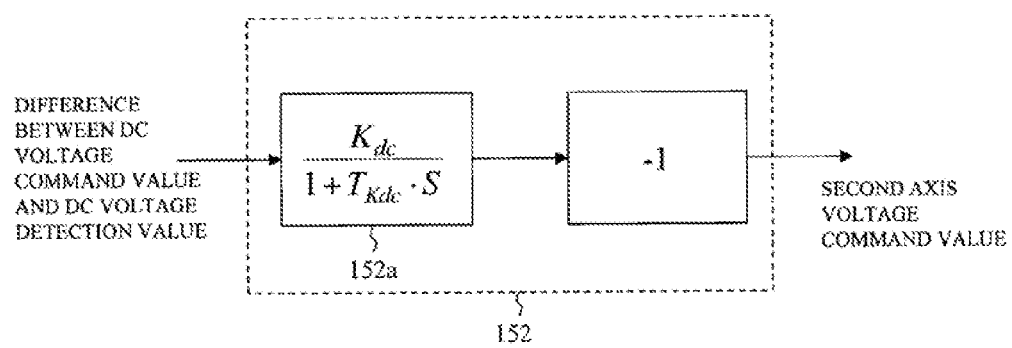
FIG. 7 is a view explaining a command value calculation circuit provided by the static synchronous compensator according to the disclosure.
Figure 8:
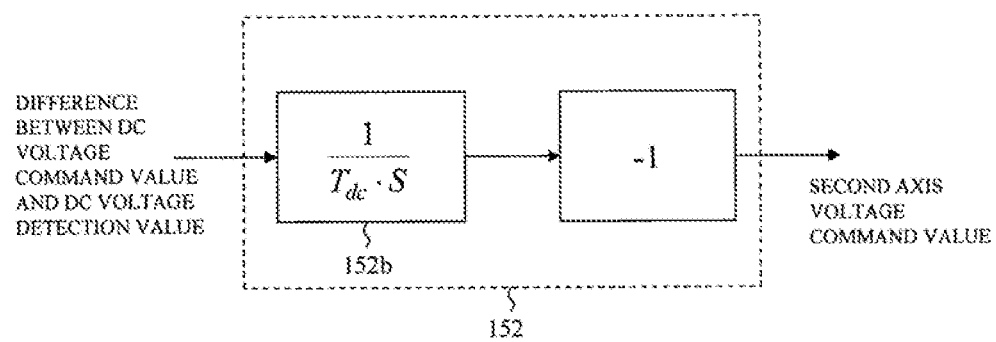
FIG. 8 is a view explaining a command value calculation circuit provided by the static synchronous compensator according to the disclosure.
Figure 9:
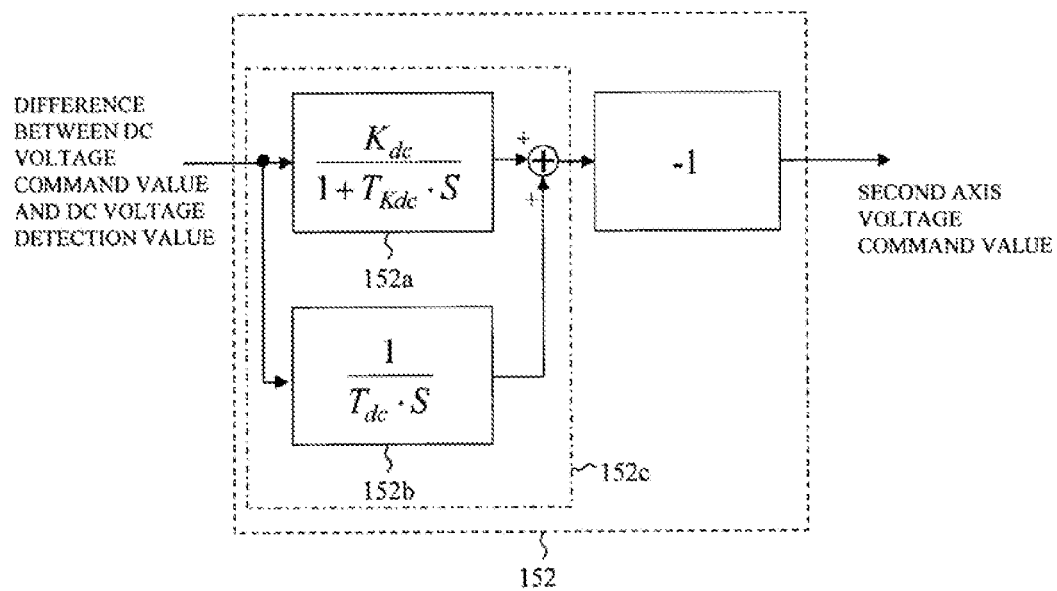
FIG. 9 is a view explaining a command value calculation circuit provided by the static synchronous compensator according to the disclosure.

FIG. 7-FIG. 9 are views explaining a calculation of the command value calculation circuit 152. A command value calculation circuit 152 of FIG. 7 calculates the difference between the DC voltage command value and the DC voltage detection value by a low pass characteristics circuit 152a. The low pass characteristics circuit 152a has the characteristics of Expression 1.

[Expression 1]

$$\hat{V}_2^*(s) = -\frac{K_{dc}}{1+T_{Kdc} \cdot s}(\hat{V}_D^*(s) - \hat{V}_D(s)) \quad (1)$$

Here, $V_2^*$ shows the second axis voltage command, $V_D^*$ shows the DC voltage command value, $V_D$ shows the DC voltage detection value, s shows a variable of Laplace transform, Kdc shows a proportional gain, $T_{Kdc}$ shows a primary delayed time constant, and is shows Laplace transform. The command value calculation circuit is more excellent in a transient response than a command value calculation circuit using an integration circuit which will be described later.

A command value calculation circuit 152 of FIG. 8 calculates the difference between the DC voltage command value and the DC voltage detection value by an integration circuit 152b. The integration circuit 152b has the characteristics of Expression 2.

[Expression 2]

$$\hat{V}_2^*(s) = -\frac{1}{T_{dc} \cdot s}(\hat{V}_D^*(s) - \hat{V}_D(s)) \quad (2)$$

Here, $V_2^*$ shows the second axis voltage command, $V_D^*$ shows the DC voltage command value, $V_D$ shows the DC voltage detection value, s shows a variable of Laplace transform, $T_{dc}$ shows an integration time constant, and ^ shows the Laplace transform. The command value calculation circuit has the error of a DC voltage in a steady state which is smaller than that of the command value calculation circuit using the low pass characteristics circuit described above.

A command value calculation circuit 152 of FIG. 9 calculates the difference between the DC voltage command value and the DC voltage detection value by a parallel circuit 152c having the low pass characteristics circuit 152a and the integration circuit 152b disposed in parallel with each other. The parallel circuit 152c has the characteristics of Expression 3.

[Expression 3]

$$\hat{V}_2^*(s) = \left(-\frac{K_{dc}}{1+T_{Kdc}\cdot s} - \frac{1}{T_{dc}\cdot s}\right)\left(\hat{V}_D^*(s) - \hat{V}_D(s)\right) \quad (3)$$

Here, $V_2^*$ shows the second axis voltage command, $V_D^*$ shows the DC voltage command value, $V_D$ shows the DC voltage detection value, s shows a variable of Laplace transform, Kdc shows the proportional gain, $T_{Kdc}$ shows the primary delayed time constant, Tdc shows the integration time constant, and ^ shows the Laplace transform. Since the command value calculation circuit has the low pass characteristics circuit disposed in parallel with the integration circuit, it can realize a transient response and a stationary error at the same time.

In the voltage command circuit 150-1 shown in FIG. 1, as the first axis voltage command $V_1^*$, the voltage (the appropriate voltage) of the AC terminal 21 is preset or input from outside as the first axis voltage command value $V_1^*$. However, as shown in a voltage command circuit 150-2 of FIG. 10, an AC current detecting circuit 34 and an AC power measuring circuit 140 may be provided and the value calculated using the ineffective power measured by the AC power measuring circuit 140 may be output as the first axis voltage command $V_1^*$.

Figure 10:
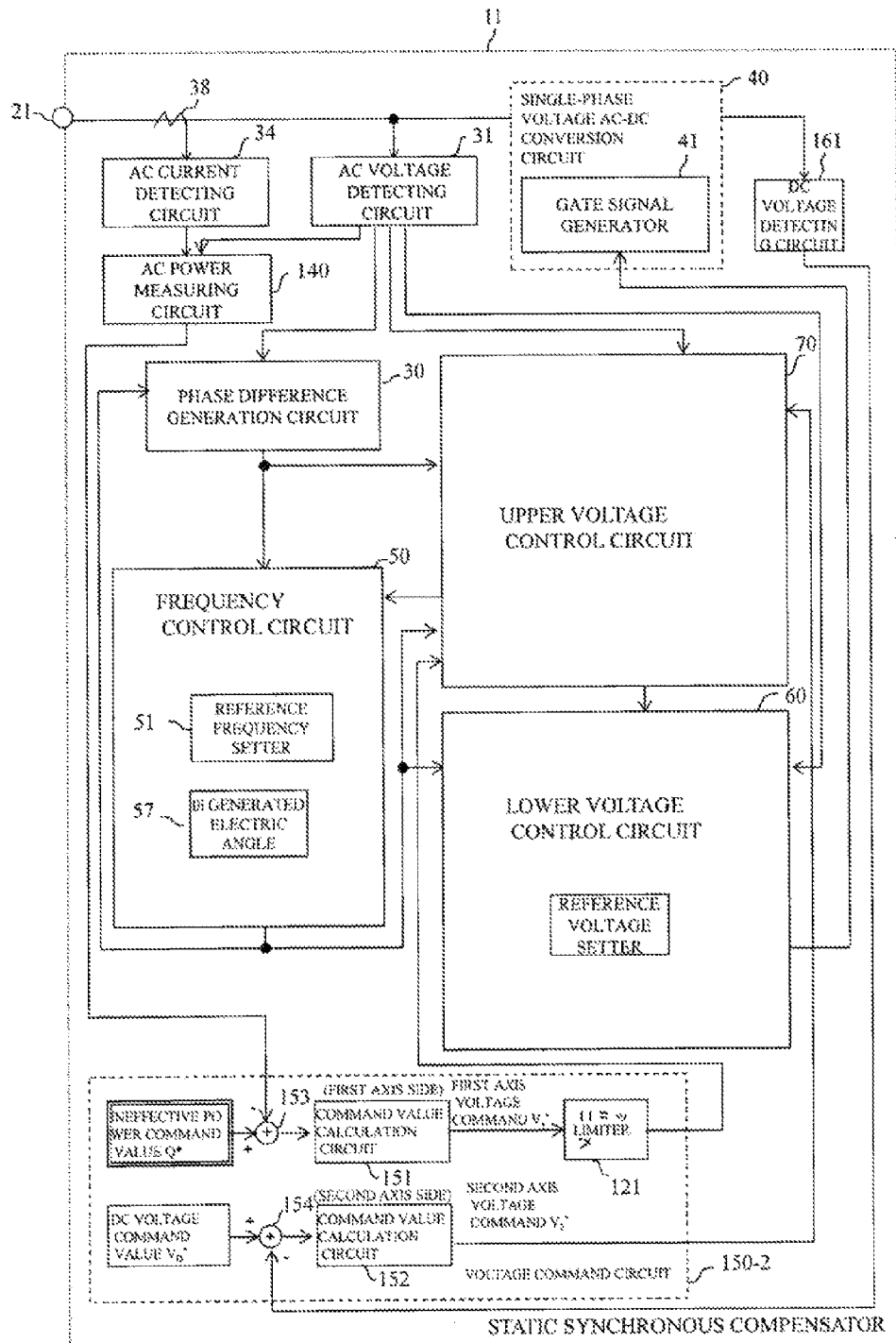
FIG. 10 is a view explaining the simultaneous control of a DC voltage and an ineffective power in the static synchronous compensator according to the disclosure.

The AC current detecting circuit 34 shown in FIG. 10 detects the single-phase AC current of the AC terminal 21 via a current transformer 38 and outputs it to the AC power measuring circuit 140. The voltage command circuit 150-2 is input with the ineffective power value of the single-phase output power of the AC terminal 21 calculated by the AC power measuring circuit 140, an adding circuit 153 calculates the difference between the ineffective power value of the single-phase output power of the AC terminal 21 and an ineffective power command value Q*, and an command value calculation circuit 151, which will be described later, generates and outputs the first axis voltage command $V_1^*$. The ineffective power command value Q* is a command value that is preset or input from outside.

Likewise, the command value calculation circuit 152, the command value calculation circuit 151 is a circuit configured by combining a low-pass filter characteristics circuit and an integration circuit, calculates the difference between the ineffective power command value Q* and the ineffective power value and generates the first axis voltage command.

When, for example, the command value calculation circuit 151 and the command value calculation circuit 152 are configured by the circuit having the low-pass filter characteristics circuit and the integration circuit connected in parallel with each other, the first axis voltage command and the second axis voltage command can be calculated by the following expression.

[Expression 4]

$$\begin{pmatrix} \hat{V}_1^*(s) \\ \hat{V}_2^*(s) \end{pmatrix} = \quad (4)$$

$$\begin{pmatrix} \frac{K_Q}{1+T_{KQ}\cdot s} + \frac{1}{T_Q\cdot s} & 0 \\ 0 & -\frac{K_{dc}}{1+T_{Kdc}\cdot s} - \frac{1}{T_{dc}\cdot s} \end{pmatrix} \begin{pmatrix} \hat{Q}^*(s) - \hat{Q}(s) \\ \hat{V}_D^*(s) - \hat{V}_D(s) \end{pmatrix}$$

Here, $V_1^*$: first axis voltage command [V]
$V_2^*$: second axis voltage command [V]
$Q^*$: ineffective power command [var]
Q: ineffective power value [var]
$V_D^*$: DC voltage command value [V]
$V_D$: DC voltage detection value [V]
$K_Q$: primary delayed gain of Q control
$T_{KQ}$: primary delayed time constant of Q control [s]
$T_Q$: integration time constant of Q control [c]
$K_{dc}$: primary delayed gain of DC voltage control
$T_{Kdc}$: primary delayed time constant of DC voltage control [s]
$T_{dc}$: integration time constant of DC voltage control [s]
^: Laplace transform.

A limiter 121 determines the upper limit and the lower limit of the first axis voltage command $V_1^*$ and prevents the first axis voltage command $V_1^*$ from being excessively input to the upper voltage control circuit 70.

Although the following explanation will be made based on the static synchronous compensator composed of the voltage command circuit 150-1, the explanation is also the same as to the static synchronous compensator composed of the voltage command circuit 150-2.

The AC voltage detecting circuit 31 of FIG. 1 detects the single-phase AC voltage of the AC terminal 21 and outputs it to the phase difference generation circuit 30, the lower voltage control circuit 60, and the upper voltage control circuit 70, respectively. A low-pass filter may be disposed in front of the AC voltage detecting circuit 31, and the single-phase AC voltage to the AC voltage detecting circuit 31 may be detected via the low-pass filter. A removal of a PWM component from the single-phase AC voltage can stabilize the control of the static synchronous compensator 11. Further, a low-pass filter may be disposed behind the AC voltage detecting circuit 31, and the output voltage from the AC voltage detecting circuit 31 may be output via the low-pass filter. A removal of a PWM component from the output voltage from the AC voltage detecting circuit 31 can stabilize the control of the static synchronous compensator 11.

Higher Voltage Control Circuit

Figure 11:
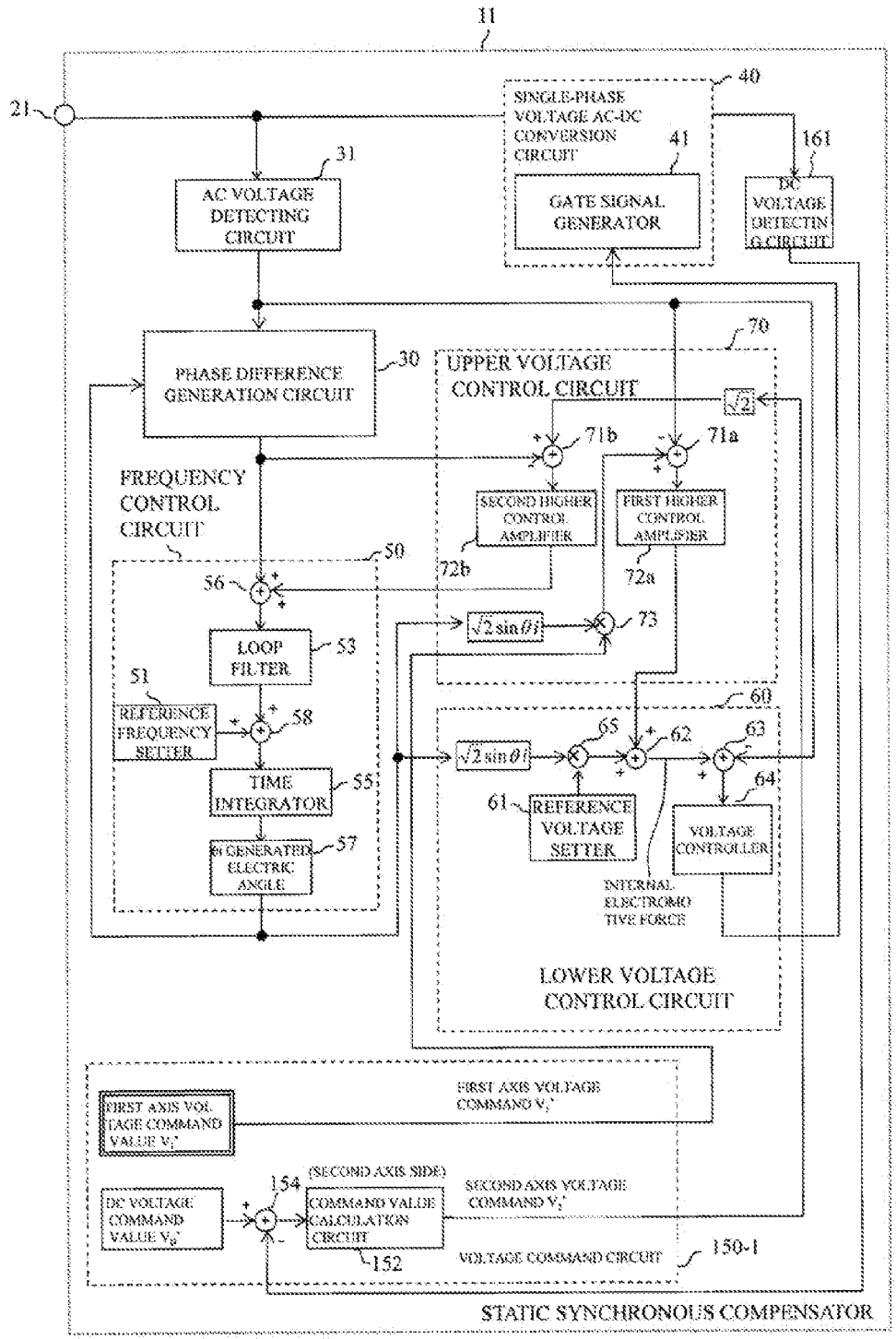
FIG. 11 is a schematic configuration view of the static synchronous compensator according to the disclosure.

The upper voltage control circuit 70 of FIG. 1 is input with the first axis voltage command $V_1^*$ and the second axis voltage command $V_2^*$ from the voltage command circuit 150-1 and with the generated electric angle 57 from the frequency control circuit 50, the phase difference voltage from the phase difference voltage generation circuit 30, and the single-phase AC voltage of the AC terminal 21 which will be described later. The upper voltage control circuit 70 outputs the voltage command signal and the frequency command signal generated so that the amplitude and the frequency of the single-phase AC voltage of the AC terminal 21 approach the first axis voltage command $V_1^*$ and the second axis voltage command $V_2^*$ based on the inputs. The upper voltage control circuit 70 may be input with the first axis voltage command $V_1^*$ and the second axis voltage command $V_2^*$ via the limiter 121 for determining the upper limit and the lower limit of them instead of being directly input with the first axis voltage command $V_1^*$ and the second axis voltage command $V_2^*$. Specifically, as shown in FIG. 11, a first multiplier 73 multiplies the value, which is obtained by multiplying the sine value of the generated electric angle 57 from the frequency control circuit 50 by $\sqrt{2}$, by the first axis voltage command $V_1^*$. A first subtracter 71a subtracts the single-phase AC voltage of the AC terminal 21 from the signal from the first multiplier 73. A first higher control amplifier 72a amplifies the signal from the first subtracter 71a so that the single-phase AC voltage of the AC terminal 21 approaches the first axis voltage command $V_1^*$ and outputs the amplified signal as the voltage command signal. Further, a second subtracter 71b subtracts the phase difference voltage from the phase difference generation circuit 30 from the value obtained by multiplying the second axis voltage command $V_2^*$ by $\sqrt{2}$. A second higher control amplifier 72b amplifies the signal from the second subtracter 71b so that the frequency of the single-phase AC voltage of the AC terminal 21 approaches the second axis voltage command $V_2^*$ and outputs the amplified signal as the frequency command signal.

With the operations, even if the amplitude and the frequency of the power system change, the respective errors of the amplitude and the frequency of the single-phase AC voltage of the static synchronous compensator 11 to the amplitude and the frequency can be detected. The first higher control amplifier 72a and the second higher control amplifier 72b may add a low-pass filter element to the outputs from the first subtracter 71a and the second subtracter 71b. With the configuration, a feedback loop can be stabilized. Further, a limiter may be additionally provided behind each of the first higher control amplifier 72a and the second higher control amplifier 72b and the outputs from the first higher control amplifier 72a and the second higher control amplifier 72b may be output via the limiter, which can stabilize the control by preventing an excessive output.

Phase Difference Generation Circuit

Figure 12:
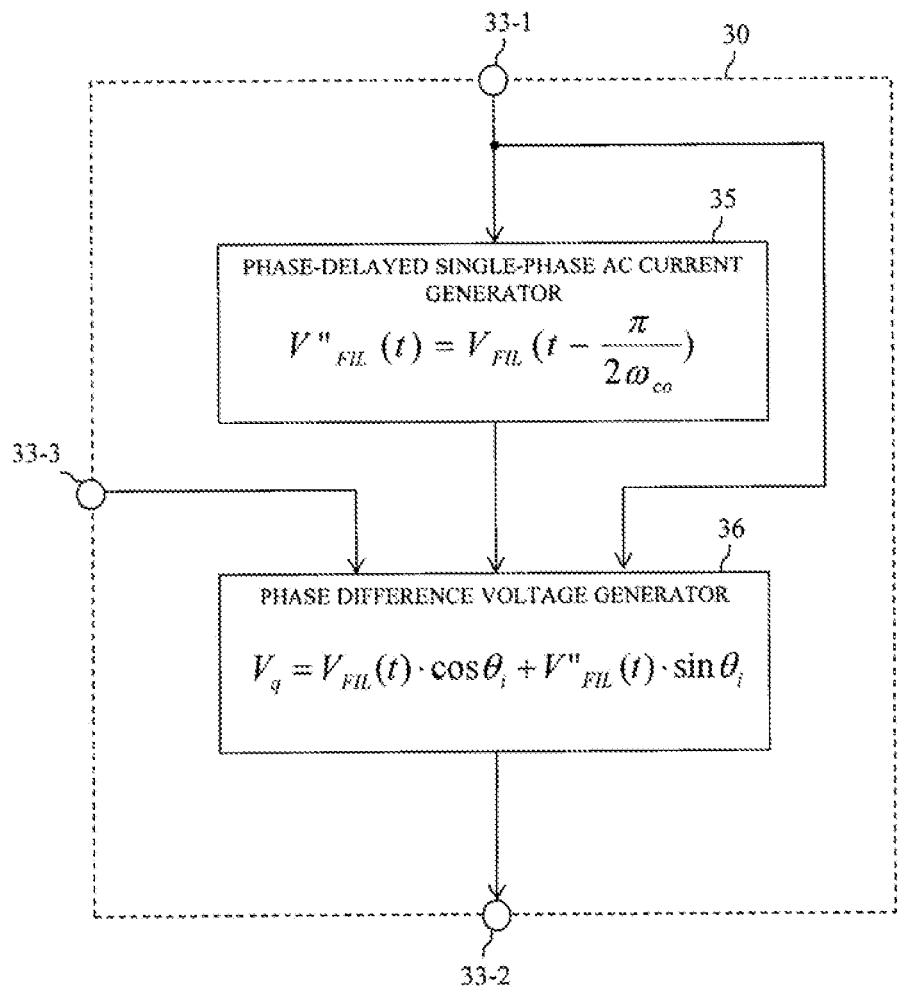
FIG. 12 is a schematic configuration view of a phase difference generation circuit provided by the static synchronous compensator according to the disclosure.

The phase difference generation circuit 30 of FIG. 1 generates the phase difference voltage corresponding to the phase difference between the single-phase AC voltage $V_{FIL}(t)$ of the AC terminal 21 and the internal electromotive force of the single-phase voltage AC-DC conversion circuit 40. FIG. 12 shows an example of a schematic configuration view of the phase difference generation circuit 30. The phase difference generation circuit 30 includes a phase-delayed single-phase AC current generator 35 for generating the phase-delayed single-phase AC current that is delayed from the single-phase AC voltage input from a terminal 33-1 by a predetermined phase, a phase difference voltage generator 36 for generating a phase difference voltage from the single-phase AC voltage input from the terminal 33-1, the voltage of the delayed single-phase AC current from the phase-delayed single-phase AC current generator 35, and the value input from a terminal 33-3, and a terminal 33-2 for outputting the phase difference voltage. In FIG. 12, although the phase-delayed single-phase AC current generator 35 delays the phase of the phase-delayed single-phase AC current approximately 90°, the angle to be delayed may be any angle other than 0° and 180°.

The terminal 33-1 is input with the single-phase AC voltage $V_{FIL}(t)$ detected by the AC voltage detecting circuit 31. The terminal 33-3 is input with the generated electric angle 57 generated by the frequency control circuit 50 which will be described later. The single-phase AC voltage $V_{FIL}(t)$ of the AC terminal 21 can be shown by Expression 5.

$$V_{FIL}(t) = \sqrt{2}E_s \cdot \sin(\omega_s t + \theta_s)[V] \quad (5)$$

Here, $\omega_s$: angle frequency [rad/s], $\theta_s$: phase angle [rad], and $E_s$: effective value [V]. Note that the internal electromotive force is used as the reference of the phase angle.

When the angle frequency $\omega_s$ of the single-phase AC voltage of the AC terminal 21 is equal to the reference angle frequency $\omega_{co}$ of the single-phase voltage AC-DC conversion circuit 40, the phase difference between the single-phase AC voltage $V_{FIL}(t)$ and the phase-delayed single-phase AC voltage $V''_{FIL}(t)$ becomes 90°, and the phase-delayed single-phase AC voltage $V''_{FIL}(t)$ generated by the phase-delayed single-phase AC current generator 35 is shown by Expression 6.

[Expression 6]

$$V''_{FIL}(t) = V_{FIL}\left(t - \frac{\pi}{2\omega_{co}}\right) \quad (6)$$
$$= \sqrt{2}E_s \cdot \sin\left(\omega_s t + \theta_s - \frac{\pi \omega_s}{2\omega_{co}}\right)$$
$$= -\sqrt{2}E_s \cdot \cos(\omega_s t + \theta_s)$$

The phase difference voltage generator 35 outputs a phase difference voltage $V_q(t)$ from the single-phase AC voltage $V_{FIL}(t)$, the phase-delayed single-phase AC voltage $V''_{FIL}(t)$, and the generated value generated by the frequency control circuit 50. The phase difference voltage $V_q(t)$ is shown by Expression 7.

[Expression 7]

$$V_q(t) = V_{FIL}(t) \cdot \cos\theta_i + V''_{FIL}(t) \cdot \sin\theta_i \quad (7)$$
$$= \sqrt{2}E_s\left\{\sin(\omega_s t + \theta_s - \theta_i) + \frac{\pi(\omega_{co} - \omega_s)}{2\omega_{co}}\sin(\omega_s t + \theta_s)\sin\theta_i\right\}$$
$$= \sqrt{2}E_s \cdot \sin(\omega_s t + \theta_s - \theta_i)$$

When an angular speed $\theta_i$ becomes equal to $\omega_s$, Expression 7 becomes constant. Since $\theta_s$ is the phase difference of the voltages between both the ends of the internal equivalent impedance, it is ordinarily small. Thus, $V_q(t)$ can be approximated as shown in Expression 8.

$$V_q(t) = \sqrt{2}E_s \cdot \theta_s \quad (8)$$

The phase difference generation circuit 30 outputs the generated phase difference voltage to the frequency control circuit 50 and the upper voltage control circuit 70, respectively. Although only the case that $\omega_s$ is equal to $\omega_{co}$ is shown here, since an approximate solution can be also obtained even if they are not equal with each other, no problem arises in practical use.

Frequency Control Circuit

The frequency control circuit 50 determines the electric angle of the internal electromotive force of the single-phase voltage AC-DC conversion circuit 40 based on the reference frequency of the single-phase AC output frequency in the AC terminal 21, the frequency command signal from the upper voltage control circuit 70, and the output signal from the phase difference generation circuit 30. Specifically, as shown in FIG. 11, the second adder 56 adds the frequency command signal from the upper voltage control circuit 70 and the phase difference voltage from the phase difference generation circuit 30. A loop filter 53 filtrates a low-pass component, which is a component relating to the frequency difference of the single-phase AC voltage, through the frequency component of the signal output by the second adder 56. A low-pass filter element added in the loop filter 53 is, for example, a delay element such as a primary delay element. With the configuration, the feedback loop can be stabilized.

Further, a third adder 58 adds the reference frequency output from a reference frequency setter 51 and the output value of the loop filter 53. A time integrator 55 time-integrates the output from the third adder 58. The generated electric angle 57, which becomes an inherent angle $\theta_i$, can be obtained by time-integrating the output from the third adder 58 by the time integrator 55.

The generated electric angle 57 is made to the electric angle of the internal electromotive force of the single-phase voltage AC-DC conversion circuit 40 by a second multiplier 65 of the lower voltage control circuit 60. As a result, the rotation angle can be caused to follow the frequency of the power system.

As described above, the phase difference generation circuit 30 outputs the phase difference voltage corresponding to the phase difference between the single-phase AC voltage of the AC terminal 21 and the internal electromotive force of the single-phase voltage AC-DC conversion circuit 40. Thus, it is thought that the signal process in the phase difference generation circuit 30 corresponds to a phase comparison process for comparing the phase of the single-phase AC voltage with the phase of the generated electric angle 57 from the frequency control circuit 50. Further, it is thought that the signal process, which adds the reference frequency from the reference frequency setter 51 and the output value from the loop filter 53 and integrates the added value, corresponds to the signal process of a VCO (Voltage Controlled Oscillator) that changes the value of the generated electric angle 57 according to the output voltage from the loop filter 53. Thus, it is thought that the phase difference generation circuit 30 and the frequency control circuit 50 carry out an operation in their entirety as a PLL for causing the generated electric angle 57 to be synchronized with the frequency of the single-phase AC voltage of the AC terminal 21.

Lower Voltage Control Circuit

The lower voltage control circuit 60 of FIG. 1 outputs the generated signal as the PWM command based on the single-phase AC voltage of the AC terminal 21, an electric angle command signal including the generated electric angle 57 of the frequency control circuit 50, and the voltage command signal from the upper voltage control circuit 70 so that the amplitude, the frequency, and the phase of the single-phase AC voltage approaches the composite value of the reference voltage of the single-phase AC voltage in the AC terminal 21, the voltage command signal, and the electric angle command signal. Further, the reference voltage is preset by a reference voltage setter 61. The reference voltage becomes the reference of the amplitude of the single-phase AC voltage of the AC terminal 21.

Specifically, as shown in FIG. 11, the reference voltage setter 61 sets and outputs the reference voltage. The second multiplier 65 multiplies the value, which is obtained by multiplying the sine value of the generated electric angle 57 from the frequency control circuit 50 by $\sqrt{2}$, by the reference voltage from the reference voltage setter 61. A first adder 62 adds the voltage command signal from the upper voltage control circuit 70 and the signal output by the second multiplier 65 and outputs the added value. A third subtracter 63 subtracts the signal from the AC voltage detecting circuit 31 from the signal output by the first adder 62. A voltage controller 64 controls the signal output by the third subtracter 63 so that the single-phase AC voltage of the AC terminal 21 approaches the composite value of the reference voltage, the voltage command signal, and the electric angle command signal and outputs the single AC voltage as the PWM command.

With the operation, the amplitude and the phase of the static synchronous compensator 11 can be controlled so that the error detected by the upper voltage control circuit 70 is compensated and the amplitude and the phase of the single-phase AC voltage of the static synchronous compensator 11 is caused to agree with the amplitude and the phase of the power system. An amplifier, for example, can be applied to the voltage controller 64. A low-pass filter may be additionally provided between the third subtracter 63 and the voltage controller 64 and the output from the third subtracter 63 may be output via the low-pass filter, which can stabilize the control in the voltage controller 64. A voltage limiter may be provided between the third subtracter 63 and the voltage controller 64 (when the low-pass filter is provided at the position, between the low-pass filter and the voltage controller 64) and the output from the third subtracter 63 may be output via the voltage limiter, which can suppress the transient variation of the voltage output when the static synchronous compensator 11 starts.

Figure 13:
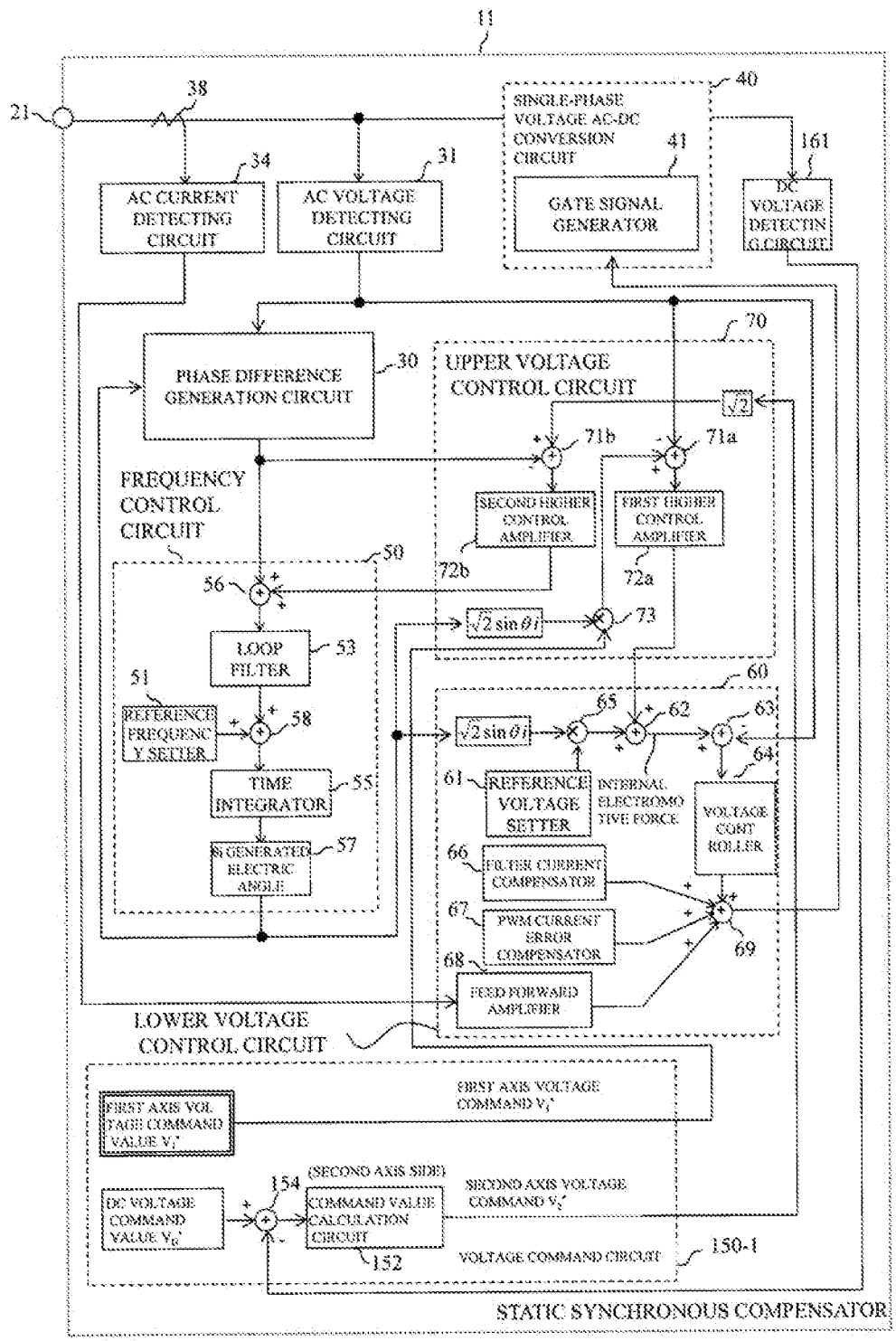
FIG. 13 is a schematic configuration view of a static synchronous compensator according to the disclosure.

FIG. 13 shows a schematic configuration view of a static synchronous compensator according to other mode.

In the static synchronous compensator 11 of FIG. 13, a fourth adder 69 further adds the outputs from a filter current compensator 66, a PWM current error compensator 67, and a feed forward amplifier 68 to the output from the voltage controller 64 of the static synchronous compensator 11 shown in FIG. 11. In the case, any of the single-phase voltage AC-DC conversion circuit 40-1 or 40-2 explained in FIG. 3 or FIG. 4 can be applied to the single-phase voltage AC-DC conversion circuit 40. Thus, in FIG. 13, it is assumed that any of the single-phase voltage AC-DC conversion circuits 40-1 and 40-2 of FIG. 3 or of FIG. 4 is applied.

The filter current compensator 66 outputs a current compensate value regulated to compensate the current loss in the single-phase AC current filter circuit 45 (FIG. 3 or FIG. 4) in the single-phase voltage AC-DC conversion circuit 40. With the operation, in the static synchronous compensator 11, the current loss in the single-phase AC current filter circuit 45 of FIG. 3 or FIG. 4 is preset by the filter current compensator 66 and added to the output vector from the voltage controller 64 so that the current loss can be compensated. Further, the PWM current error compensator 67 outputs a current error compensation value regulated to compensate the current error of the single-phase AC current from the single-phase voltage AC-DC conversion circuit 40. With the operation, in the static synchronous compensator 11, the PWM current error compensator 67 presets the current error in the single-phase voltage AC-DC conversion circuit 40 when the PWM command is set to a zero command and adds the current error to the output vector from the voltage controller 64 so that the current error can be compensated. Further, the feed forward amplifier 68 is input with the value of the single-phase AC current detected by the AC current detecting circuit 34, amplifies the value by a predetermined feed forward gain to compensate a current to the load of the AC terminal 21, and outputs the value. With the operation, in the static synchronous compensator 11, the AC current detecting circuit 34 detects the single-phase AC current of the AC terminal 21 and adds the value to the output value from the voltage controller 64 via the feed forward amplifier 68 so that even if a load current changes, a stable output voltage can be generated.

The AC power measuring circuit 140 of FIG. 10 is input with the value of the single-phase AC voltage of the AC terminal 21 detected by the AC voltage detecting circuit 31 and with the value of the single-phase AC current of the AC terminal 21 detected by the AC current detecting circuit 34 and calculates the effective power value and the ineffective power value of single-phase output power in the AC terminal 21.

Figure 14:
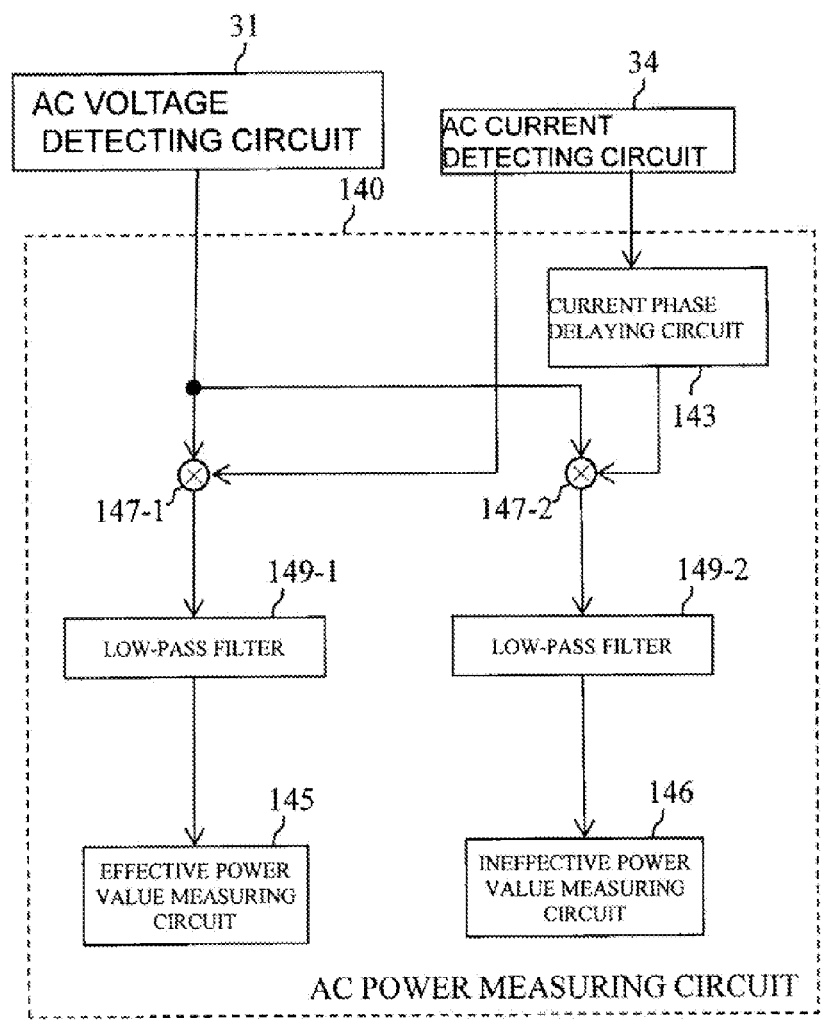
FIG. 14 is a schematic configuration view of an AC power measuring circuit provided by the static synchronous compensator according to the disclosure.

Specifically, as shown in FIG. 14, in the AC power measuring circuit 140, an effective power value measuring circuit 145 measures the effective power value by causing the product, which is obtained by multiplying the voltage and the current at a power measuring point measured by the voltage detecting circuit 31 and the current detecting circuit 34, respectively by a multiplier 147-1, to pass through a low-pass filter 149-1. Further, a function in which the current phase at the power measuring point is offset 90° by a current phase delaying circuit 143 is generated, and the ineffective power value is measured by an ineffective power value measuring circuit 146 by causing the product, which is obtained by multiplying the function and the voltage at the power measuring point by a multiplier 147-2, to pass through a low-pass filter 149-2.

Figure 15:
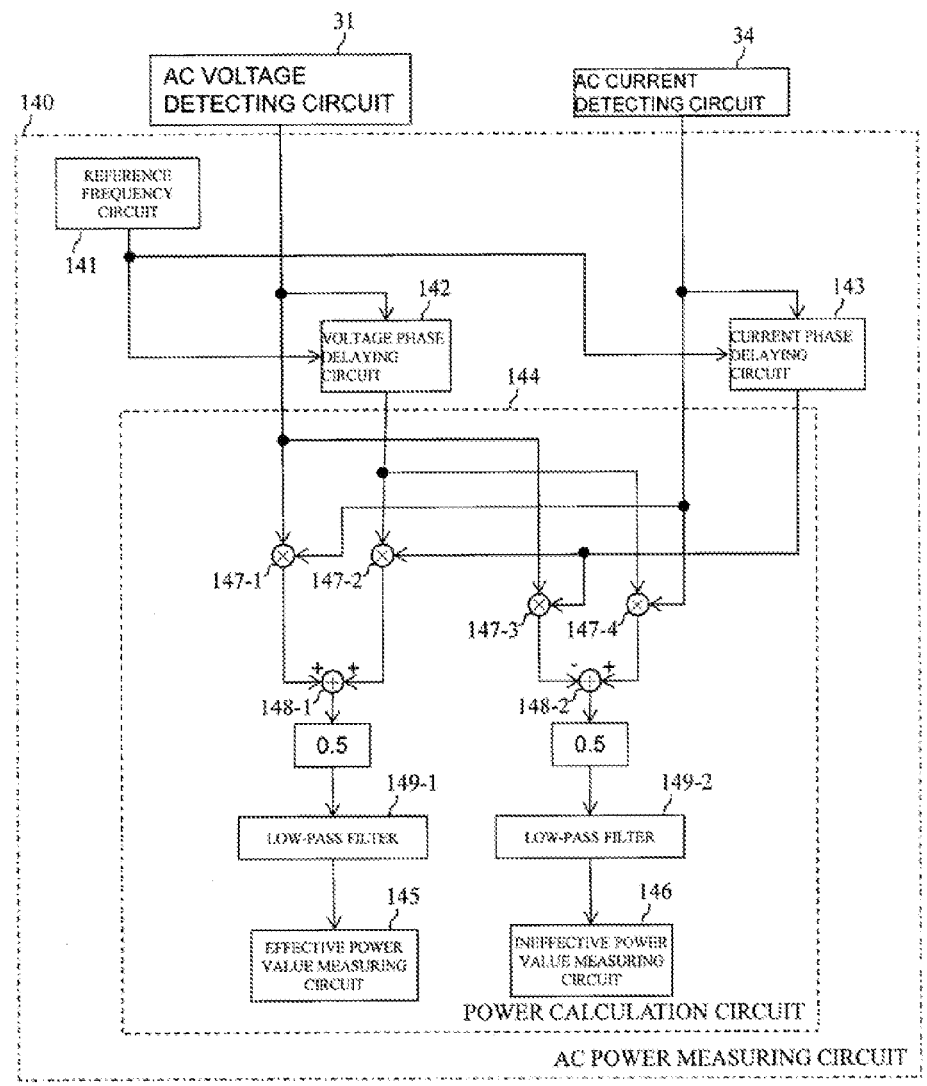
FIG. 15 is a schematic configuration view of an AC power measuring circuit provided by the static synchronous compensator according to the disclosure.

The AC power measuring circuit 140 may be configured as shown in FIG. 15. The AC power measuring circuit 140 includes a reference frequency circuit 141 for generating the reference frequency, a voltage phase delaying circuit 142 for generating a delayed AC voltage by delaying the phase of a measured AC voltage that is the AC voltage at the power measuring point based on the reference frequency from the reference frequency circuit 141, a current phase delaying circuit 143 for generating a delayed AC current by delaying the phase of a measured AC current that is the AC current at the power measuring point based on the reference frequency from the reference frequency circuit 141, and a power calculation circuit 144. In the power calculation circuit 144, an adder 148-1 adds the multiplied value, which is obtained by multiplying the measured AC voltage and the measured AC current by the multiplier 147-1, and the multiplied value, which is obtained by multiplying the delayed AC voltage from the voltage phase delaying circuit 142 and the delayed AC current from the current phase delaying circuit 143 by the multiplier 147-2, and an effective power value measuring circuit 145 measures the added value as the effective power value by causing the added value to pass through the low-pass filter 149-1. Further, a subtracter 148-2 subtracts the multiplied value, which is obtained by multiplying the measured AC voltage and the delayed AC current from the current phase delaying circuit 143 by a multiplier 147-3 from the multiplied value, which is obtained by multiplying the measured AC current and the delayed AC voltage from the voltage phase delaying circuit 142 by a multiplier 147-4, and the ineffective power value measuring circuit 146 measures the subtracted value as the ineffective power by causing the subtracted value to pass through the low-pass filter 149-2. The addition of the multiplied value of the delayed AC voltage and the delayed AC current to the multiplied value of the measured AC voltage and the measured AC current can decrease the double frequency component included in the effective power value. Further, the subtraction of the multiplied value of the measured AC voltage and the delayed AC current from the multiplied value of the measured AC current and the delayed AC voltage can decrease the double frequency component included in the ineffective power value. Thus, the measurement accuracy of the effective power value and the ineffective power value can be improved and the effective power value and the ineffective power value can be accurately controlled.

Example

Figure 16:
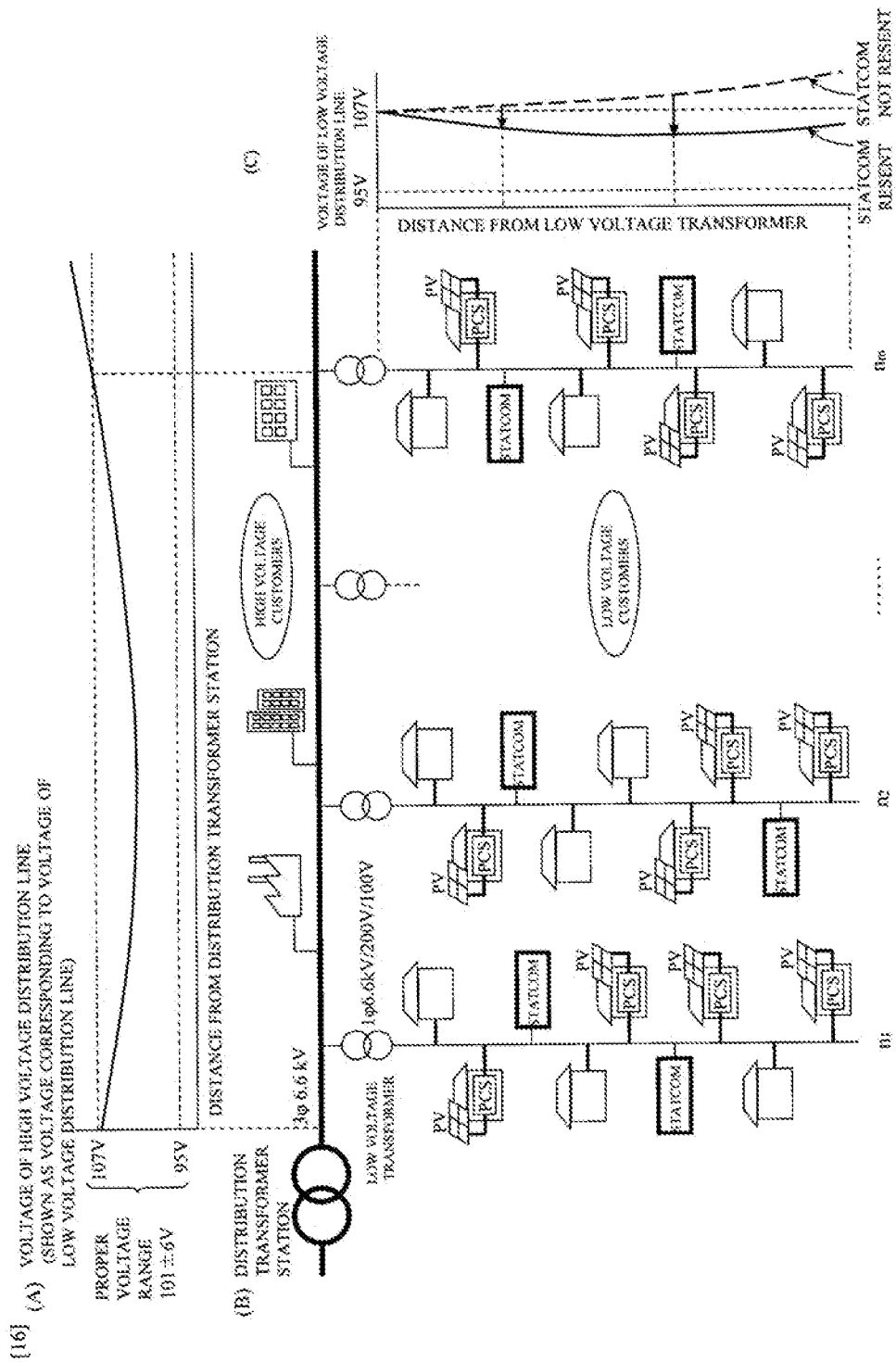
FIG. 16 is a view explaining a single-phase AC power system according to the disclosure.

Next, an example, in which the static synchronous compensator 11 (STATCOM) is connected to low voltage customers of the single-phase side of a power distribution system, will be explained using FIG. 16. FIG. 16(A) is a view showing the voltage of a high voltage distribution line to the distance from a power distribution station. FIG. 16(B) is a view showing an example in which the low voltage customers connected to the respective systems $(n_1, n_2, \ldots n_m)$ of a single-phase alternating current side, are provided with plural STATCOMs. FIG. 16(C) is a view showing the voltage of a low voltage distribution line to the distance from a low voltage transformer installed to a high voltage distribution line.

The voltage of the high voltage distribution line shown in FIG. 16(A) is a value converted to the voltage of the low voltage distribution line. Since a PV supplies no power in rain and at night, the farther from the distribution transformer station, the more voltage decreases. In contrast, since a PV supplies power on fine days, the voltage at a location away from the distribution transformer station may increase. For example, as shown in FIG. 16(B), when many houses each provided with a power conditioner (PCS) for photovoltaic power generation (PV) exist in the respective systems of the single-phase alternating current side, the voltage of the high voltage distribution line may exceed 107 V that is the upper limit 101±6V which falls in a proper voltage range in a system terminal away from the distribution transformer station. For example, in a power distribution system $(n_m)$ apart from the distribution transformer station, when the voltage of the high voltage distribution line corresponds to 107 V that is converted to the low voltage, there is a case the voltage of the low voltage distribution line may increase to a value larger than 107 V at a distal end of the single-phase AC current apart from the high voltage distribution line.

When the voltage of the power system varies as described above, since the difference between the voltage of the AC terminal 21 and the internal electromotive force is generated, the static synchronous compensator 11 carries out the PWM control to decrease or increase the voltage of the AC terminal side of the single-phase voltage AC-DC conversion circuit 40. For example, in the case the voltage of the power system increases, since the static synchronous compensator 11 decreases the voltage of the AC terminal side of the single-phase voltage AC-DC conversion circuit 40, the voltage of the single-phase voltage AC-DC conversion circuit 40 becomes lower than the voltage of the single-phase AC power system and the ineffective current flows from the single-phase AC power system in the static synchronous compensator 40 so that the voltage of the single-phase AC power system can be decreased.

In general, although the provision of the STATCOM on a high voltage distribution side can suppress an increase of the voltage of the high voltage distribution line side in a proper voltage range, it has been difficult to locally control a voltage increase in the respective systems of the low voltage single-phase AC current side. In the example, since the STATCOM can be provided on the single-phase AC current side of the low voltage side, the voltage increase in the respective systems $(n_1, n_2, \ldots n_m)$ of the low voltage single-phase AC current side can be locally controlled.

REFERENCE SIGNS LIST

11: static synchronous compensator
21: AC terminal
30: phase difference generation circuit
31: AC voltage detecting circuit
33-1-33-3: terminal
34: output current detecting circuit
35: phase-delayed single-phase AC current generator 36: phase difference voltage generator
38: transformer
40: single-phase voltage AC-DC conversion circuit
40-1, 40-2: single-phase voltage AC-DC conversion circuit
41: gate signal generator
42: single-phase voltage AC-DC converter
43: current detecting circuit
44: voltage detecting circuit
45: single-phase AC current filter circuit
50: frequency control circuit
51: reference frequency setter
53: loop filter
55: time integrator
56: second adder
57: generated electric angle
58: third adder
60: lower voltage control circuit
61: reference voltage setter
62: first adder
63: third subtracter
64: voltage controller
65: second multiplier
66: filter current compensator
67: PWM current error compensator
68: feed forward amplifier
69: fourth adder
70: upper voltage control circuit
71a: first subtracter
71b: second subtracter
72a: first higher control amplifier
72b: second higher control amplifier
73: first multiplier
121: limiter
140: AC power measuring circuit
141: reference frequency circuit
142: voltage phase delaying circuit
143: current phase delaying circuit
144: power calculation circuit
145: effective power value measuring circuit
146: ineffective power value measuring circuit
147-1, 147-2, 147-3, 147-4: multiplier
148-1: adder
148-2: subtracter
149-1, 149-2: low-pass filter
150-1, 150-2: voltage command circuit
161: DC voltage detecting circuit
B1: voltage command
B2: upper voltage command
B3: frequency control
B4: lower voltage control
B5: gate signal generation
B6: main switch

What is claimed is:

1. A static synchronous compensator comprising:
a single-phase voltage AC-DC conversion circuit having an internal electromotive force and an internal equivalent impedance when viewed from an AC terminal and converting between a single-phase AC power from a single-phase AC power system connected to the AC terminal and a DC power according to the pulse width of a gate signal generated based on a PWM command;
a voltage command circuit outputting a first axis voltage command acting as an amplitude target value of a single-phase AC voltage of the AC terminal, set with a DC voltage command value higher than the peak value of the single-phase AC voltage, detecting the DC voltage converted by the single-phase voltage AC-DC conversion circuit, and outputting the second axis voltage command by calculating the difference between the DC voltage command value and the DC voltage detection value;
a phase difference generation circuit having a phase-delayed single-phase AC current generator for delaying the phase of a single-phase AC voltage of the AC terminal and generating a delayed single-phase AC current and generating a voltage corresponding to the phase difference between the single-phase AC voltage of the AC terminal and the internal electromotive force of the single-phase voltage AC-DC conversion circuit based on the delayed single-phase AC current;
a upper voltage control circuit outputting a voltage command signal generated so that the amplitude of the single-phase AC voltage of the AC terminal approaches the first axis voltage command and a frequency command signal generated so that a voltage corresponding to the phase difference from the phase difference generation circuit approaches the second axis voltage command based on the first axis voltage command and the second axis voltage command from the voltage command circuit, the voltage corresponding to the phase difference from the phase difference generation circuit, and the single-phase AC voltage of the AC terminal;
a frequency control circuit set with a reference frequency acting as a reference of the frequency of the single-phase AC current in the AC terminal, determining the electric angle of the internal electromotive force of the single-phase voltage AC-DC conversion circuit based on the reference frequency, the frequency command signal from the upper voltage control circuit, and the voltage corresponding to the phase difference generated by the phase difference generation circuit, and generating a generated electric angle; and
a lower voltage control circuit set with a reference voltage acting as a reference of the voltage amplitude of the single-phase AC current in the AC terminal, using the value obtained by adding the voltage command signal from the upper voltage control circuit to the value, which is obtained by multiplying the signal based on the electric angle from the frequency control circuit and the reference voltage, as an internal electromotive force and outputting the difference between the internal electromotive force and the single-phase AC voltage as the PWM command.

2. The static synchronous compensator according to claim 1, wherein the first axis voltage command output by the voltage command circuit is a preset fixed value.

3. The static synchronous compensator according to claim 1, further comprising:
an AC current detecting circuit for detecting the AC current in the AC terminal; and
an AC power measuring circuit for measuring an ineffective power in the AC terminal,
wherein, the voltage command circuit calculates the difference between the ineffective power measured by the AC power measuring circuit and a preset ineffective power command value and uses the difference as the first axis voltage command.

4. A voltage control method for converging the voltage of a single-phase AC power system in a proper voltage range using a single-phase voltage AC-DC conversion circuit having an internal electromotive force and an internal equivalent impedance when viewed from an AC terminal and converting between a single-phase AC power from the single-phase AC power system connected to the AC terminal and a DC power according to the pulse width of a gate signal generated based on a PWM command, comprising:

a voltage command process outputting a first axis voltage command acting as an amplitude target value of a single-phase AC voltage of the AC terminal, set with a DC voltage command value higher than the peak value of the single-phase AC voltage, detecting the DC voltage converted by the single-phase voltage AC-DC conversion circuit, and outputting the second axis voltage command by calculating the difference between the DC voltage command value and the DC voltage detection value;

a phase difference generation process generating a delayed single-phase AC current in which the phase of a single-phase AC voltage of the AC terminal is delayed by a phase-delayed single-phase AC current generator and generating a voltage corresponding to the phase difference between the single-phase AC voltage of the AC terminal and the internal electromotive force of the single-phase voltage AC-DC conversion circuit based on the delayed single-phase AC current;

a upper voltage control process for outputting a voltage command signal generated so that the amplitude of the single-phase AC voltage of the AC terminal approaches the first axis voltage command and a frequency command signal generated so that a voltage corresponding to the phase difference generated by the phase difference generation process approaches the second axis voltage command based on the first axis voltage command and the second axis voltage command output at the voltage command process, the voltage corresponding to the phase difference generated at the phase difference generation process, and the single-phase AC voltage of the AC terminal;

a frequency control process determining the electric angle of the internal electromotive force of the single-phase voltage AC-DC conversion circuit based on a reference frequency acting as a reference of the frequency of the single-phase AC current in the AC terminal and on a voltage corresponding to the frequency command signal output at the upper voltage control process and the phase difference generated at the phase difference generation process and generating a generated electric angle; and a lower voltage control process using the value obtained by adding the voltage command signal output at the upper voltage control process to the value, which is obtained by multiplying a reference voltage acting as a reference of the voltage amplitude of the single-phase AC current in the AC terminal and the signal based on the electric angle from the frequency control circuit, as the internal electromotive force and outputting the difference between the internal electromotive force and the single-phase AC voltage as the PWM command.

5. The voltage control method according to claim 4, wherein the first axis voltage command output at the voltage command process is a preset fixed value.

6. The voltage control method according to claim 4 further executes;

an AC current detecting process for detecting the AC current in the AC terminal; and an AC power measuring process measuring the ineffective power in the AC terminal, wherein the voltage command process calculates the difference between the ineffective power measured at the AC power measuring process and a preset ineffective power command value and uses the difference as the first axis voltage command.

7. The voltage control method according to claim 4, wherein:

an AC terminal, of at least one set of a static synchronous compensator comprising a single-phase voltage AC-DC conversion circuit having an internal electromotive force and an internal equivalent impedance when viewed from said AC terminal and converting between a single-phase AC power from a single-phase AC power system connected to the AC terminal and a DC power according to the pulse width of a gate signal generated based on a PWM command; a voltage command circuit outputting a first axis voltage command acting as an amplitude target value of a single-phase AC voltage of the AC terminal, set with a DC voltage command value higher than the peak value of the single-phase AC voltage, detecting the DC voltage converted by the single-phase voltage AC-DC conversion circuit, and outputting the second axis voltage command by calculating the difference between the DC voltage command value and the DC voltage detection value; a phase difference generation circuit having a phase-delayed single-phase AC current generator for delaying the phase of a single-phase AC voltage of the AC terminal and generating a delayed single-phase AC current and generating a voltage corresponding to the phase difference between the single-phase AC voltage of the AC terminal and the internal electromotive force of the single-phase voltage AC-DC conversion circuit based on the delayed single-phase AC current; an upper voltage control circuit outputting a voltage command signal generated so that the amplitude of the single-phase AC voltage of the AC terminal approaches the first axis voltage command and a frequency command signal generated so that a voltage corresponding to the phase difference from the phase difference generation circuit approaches the second axis voltage command based on the first axis voltage command and the second axis voltage command from the voltage command circuit, the voltage corresponding to the phase difference from the phase difference generation circuit, and the single-phase AC voltage of the AC terminal; a frequency control circuit set with a reference frequency acting as a reference of the frequency of the single-phase AC current in the AC terminal, determining the electric angle of the internal electromotive force of the single-phase voltage AC-DC conversion circuit based on the reference frequency, the frequency command signal from the upper voltage control circuit, and the voltage corresponding to the phase difference generated by the phase difference generation circuit, and generating a generated electric angle; and a lower voltage control circuit set with a reference voltage acting as a reference of the voltage amplitude of the single-phase AC current in the AC terminal, using the value obtained by adding the voltage command signal from the upper voltage control circuit to the value, which is obtained by multiplying the signal based on the electric angle from the frequency control circuit and the reference voltage, as an internal electromotive force and outputting the difference between the internal electromotive force and the single-phase AC voltage as the PWM command, is connected to a single-phase AC power system; and the voltage of the single-phase AC power system is converged in a proper voltage range.

8. The voltage control method according to claim 5, wherein:

an AC terminal, of at least one set of a static synchronous compensator comprising a single-phase voltage AC-DC conversion circuit having an internal electromotive force and an internal equivalent impedance when viewed from said AC terminal and converting between a single-phase AC power from a single-phase AC power system connected to the AC terminal and a DC power according to the pulse width of a gate signal generated based on a PWM command; a voltage command circuit outputting a first axis voltage command acting as an amplitude target value of a single-phase AC voltage of the AC terminal, set with a DC voltage command value higher than the peak value of the single-phase AC voltage, detecting the DC voltage converted by the single-phase voltage AC-DC conversion circuit, and outputting the second axis voltage command by calculating the difference between the DC voltage command value and the DC voltage detection value; a phase difference generation circuit having a phase-delayed single-phase AC current generator for delaying the phase of a single-phase AC voltage of the AC terminal and generating a delayed single-phase AC current and generating a voltage corresponding to the phase difference between the single-phase AC voltage of the AC terminal and the internal electromotive force of the single-phase voltage AC-DC conversion circuit based on the delayed single-phase AC current; an upper voltage control circuit outputting a voltage command signal generated so that the amplitude of the single-phase AC voltage of the AC terminal approaches the first axis voltage command and a frequency command signal generated so that a voltage corresponding to the phase difference from the phase difference generation circuit approaches the second axis voltage command based on the first axis voltage command and the second axis voltage command from the voltage command circuit, the voltage corresponding to the phase difference from the phase difference generation circuit, and the single-phase AC voltage of the AC terminal; a frequency control circuit set with a reference frequency acting as a reference of the frequency of the single-phase AC current in the AC terminal, determining the electric angle of the internal electromotive force of the single-phase voltage AC-DC conversion circuit based on the reference frequency, the frequency command signal from the upper voltage control circuit, and the voltage corresponding to the phase difference generated by the phase difference generation circuit, and generating a generated electric angle; and a lower voltage control circuit set with a reference voltage acting as a reference of the voltage amplitude of the single-phase AC current in the AC terminal, using the value obtained by adding the voltage command signal from the upper voltage control circuit to the value, which is obtained by multiplying the signal based on the electric angle from the frequency control circuit and the reference voltage, as an internal electromotive force and outputting the difference between the internal electromotive force and the single-phase AC voltage as the PWM command, is connected to a single-phase AC power system, wherein the first axis voltage command output by the voltage command circuit is a preset fixed value; and the voltage of the single-phase AC power system is converged in a proper voltage range.

9. The voltage control method according to claim 6, wherein:

an AC terminal, of at least one set of the static synchronous compensator comprising a single-phase voltage AC-DC conversion circuit having an internal electromotive force and an internal equivalent impedance when viewed from said AC terminal and converting between a single-phase AC power from a single-phase AC power system connected to the AC terminal and a DC power according to the pulse width of a gate signal generated based on a PWM command; a voltage command circuit outputting a first axis voltage command acting as an amplitude target value of a single-phase AC voltage of the AC terminal, set with a DC voltage command value higher than the peak value of the single-phase AC voltage, detecting the DC voltage converted by the single-phase voltage AC-DC conversion circuit, and outputting the second axis voltage command by calculating the difference between the DC voltage command value and the DC voltage detection value; a phase difference generation circuit having a phase-delayed single-phase AC current generator for delaying the phase of a single-phase AC voltage of the AC terminal and generating a delayed single-phase AC current and generating a voltage corresponding to the phase difference between the single-phase AC voltage of the AC terminal and the internal electromotive force of the single-phase voltage AC-DC conversion circuit based on the delayed single-phase AC current; an upper voltage control circuit outputting a voltage command signal generated so that the amplitude of the single-phase AC voltage of the AC terminal approaches the first axis voltage command and a frequency command signal generated so that a voltage corresponding to the phase difference from the phase difference generation circuit approaches the second axis voltage command based on the first axis voltage command and the second axis voltage command from the voltage command circuit, the voltage corresponding to the phase difference from the phase difference generation circuit, and the single-phase AC voltage of the AC terminal; a frequency control circuit set with a reference frequency acting as a reference of the frequency of the single-phase AC current in the AC terminal, determining the electric angle of the internal electromotive force of the single-phase voltage AC-DC conversion circuit based on the reference frequency, the frequency command signal from the upper voltage control circuit, and the voltage corresponding to the phase difference generated by the phase difference generation circuit, and generating a generated electric angle; and a lower voltage control circuit set with a reference voltage acting as a reference of the voltage amplitude of the single-phase AC current in the AC terminal, using the value obtained by adding the voltage command signal from the upper voltage control circuit to the value, which is obtained by multiplying the signal based on the electric angle from the frequency control circuit and the reference voltage, as an internal electromotive force and outputting the difference between the internal electromotive force and the single-phase AC voltage as the PWM command, is connected to a single-phase AC power system, wherein said static synchronous compensator further comprises: an AC current detecting circuit for detecting the AC current in the AC terminal; and an AC power measuring circuit for measuring an ineffective power in the AC terminal, wherein, the voltage command circuit calculates the difference between the ineffective power measured by the AC power measuring circuit and a preset ineffective power command value and uses the difference as the first axis voltage command; and the voltage of the single-phase AC power system is converged in a proper voltage range.

* * * * *